(12) United States Patent
Yu et al.

(10) Patent No.: US 9,185,408 B2
(45) Date of Patent: Nov. 10, 2015

(54) EFFICIENT STORAGE OF MOTION INFORMATION FOR HIGH EFFICIENCY VIDEO CODING

(71) Applicant: Google Technology Holdings LLC, Mountain View, CA (US)

(72) Inventors: Yue Yu, San Diego, CA (US); Krit Panusopone, San Diego, CA (US); Limin Wang, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 348 days.

(21) Appl. No.: 13/679,720

(22) Filed: Nov. 16, 2012

(65) Prior Publication Data

US 2013/0182769 A1 Jul. 18, 2013

Related U.S. Application Data

(60) Provisional application No. 61/561,779, filed on Nov. 18, 2011, provisional application No. 61/562,418, filed on Nov. 21, 2011, provisional application No. 61/595,141, filed on Feb. 5, 2012.

(51) Int. Cl.
*H04N 19/00* (2014.01)
*H04N 19/105* (2014.01)
*H04N 19/51* (2014.01)
*H04N 19/52* (2014.01)
*H04N 19/159* (2014.01)
(Continued)

(52) U.S. Cl.
CPC ....... *H04N 19/00587* (2013.01); *H04N 19/102* (2014.11); *H04N 19/105* (2014.11); *H04N 19/134* (2014.11); *H04N 19/159* (2014.11); *H04N 19/172* (2014.11); *H04N 19/174* (2014.11); *H04N 19/463* (2014.11); *H04N 19/51* (2014.11); *H04N 19/52* (2014.11)

(58) Field of Classification Search
None
See application file for complete search history.

(56) References Cited

U.S. PATENT DOCUMENTS

2003/0058238 A1 3/2003 Doak et al.
2003/0107815 A1 6/2003 Redmond
(Continued)

FOREIGN PATENT DOCUMENTS

EP 1422946 A1 5/2004
WO WO2011050641 5/2011

OTHER PUBLICATIONS

Kadono: "Memory Reduction for Temporal Direct Mode", 5, JVT Meeting; Oct. 14, 2002-Oct. 18, 2002; Geneva, CH; (Joint Video Team of ISO/IEC JTC1/SC29/WG11 and ITU-T SG.16), No. JVT-E076, Oct. 18, 2002, all pages.

(Continued)

*Primary Examiner* — Jay Au Patel
*Assistant Examiner* — Reza Aghevli
(74) *Attorney, Agent, or Firm* — Young Basile Hanlon & MacFarlane P.C.

(57) ABSTRACT

A method, apparatus, article of manufacture, and a memory structure for signaling the storage of motion information describing the depicted motion associated with digital pictures. In one embodiment, the method comprises signaling the replacement of a motion vector stored in connection with a previously coded picture with the motion vector of the currently coded frame. Another signal may be used to indicate motion vector replacement for all pictures in a sequence.

19 Claims, 19 Drawing Sheets

(51) Int. Cl.
| | |
|---|---|
| *H04N 19/172* | (2014.01) |
| *H04N 19/134* | (2014.01) |
| *H04N 19/102* | (2014.01) |
| *H04N 19/463* | (2014.01) |
| *H04N 19/174* | (2014.01) |

(56) References Cited

U.S. PATENT DOCUMENTS

| | | | | |
|---|---|---|---|---|
| 2005/0013365 | A1* | 1/2005 | Mukerjee et al. | 375/240.16 |
| 2005/0046702 | A1 | 3/2005 | Katayama et al. | |
| 2005/0053137 | A1* | 3/2005 | Holcomb | 375/240.16 |
| 2005/0117646 | A1* | 6/2005 | Joch et al. | 375/240.16 |
| 2005/0152452 | A1 | 7/2005 | Suzuki | |
| 2005/0232356 | A1 | 10/2005 | Gomi et al. | |
| 2005/0276448 | A1 | 12/2005 | Pryor | |
| 2006/0104349 | A1 | 5/2006 | Joch et al. | |
| 2006/0219857 | A1 | 10/2006 | Satterfield | |
| 2006/0233252 | A1 | 10/2006 | Bhattacharya et al. | |
| 2007/0063997 | A1 | 3/2007 | Scherer et al. | |
| 2007/0286281 | A1 | 12/2007 | Tsuchiya et al. | |
| 2008/0136923 | A1 | 6/2008 | Inbar et al. | |
| 2008/0267290 | A1 | 10/2008 | Barbieri et al. | |
| 2009/0003446 | A1 | 1/2009 | Wu et al. | |
| 2009/0021588 | A1 | 1/2009 | Border et al. | |
| 2009/0129472 | A1* | 5/2009 | Panusopone et al. | 375/240.16 |
| 2009/0168886 | A1 | 7/2009 | Ikeda et al. | |
| 2010/0111182 | A1* | 5/2010 | Karczewicz et al. | 375/240.16 |
| 2011/0002389 | A1* | 1/2011 | Xu et al. | 375/240.16 |
| 2011/0110428 | A1 | 5/2011 | Chang et al. | |
| 2011/0228852 | A1* | 9/2011 | Budagavi | 375/240.16 |
| 2012/0082229 | A1 | 4/2012 | Su et al. | |
| 2012/0236942 | A1 | 9/2012 | Lin et al. | |
| 2013/0128967 | A1 | 5/2013 | Yu et al. | |
| 2013/0128969 | A1 | 5/2013 | Yu et al. | |
| 2013/0128970 | A1 | 5/2013 | Yu et al. | |
| 2013/0128977 | A1 | 5/2013 | Yu et al. | |
| 2013/0163663 | A1 | 6/2013 | Yu et al. | |
| 2013/0202034 | A1 | 8/2013 | Yu et al. | |
| 2013/0272375 | A1 | 10/2013 | Yu et al. | |
| 2013/0272406 | A1 | 10/2013 | Yu et al. | |
| 2014/0023142 | A1 | 1/2014 | Yu et al. | |
| 2014/0056356 | A1 | 2/2014 | Yu et al. | |

OTHER PUBLICATIONS

Y-K Wang et al.: "AHG15: On sequence parameter set and picture parameter set", 7. JCT-VC Meeting; 98. MPEG Meeting; Nov. 21, 2011-Nov. 20, 2011; Geneva; (Joint Collaborative Team on Video Coding of IS0/IEC JTC1/SC29/WG11 and ITU-T SG.16); URL:http://wftp3.itu.int/av-arch/jctvc-site/,, No. JCTVC-G334, Nov. 9, 2011, all pages.

J-L Lin et al.: "Improved Advanced Motion Vector Prediction", 4. JCT-VC Meeting; 95, MPEG Meeting; Jan. 20, 2011-Jan. 28, 2011; Daegu; (Joint Collaborative Team on Video Coding of ISO/IEC JTC1/SC29/WG11and ITU-T SG.16); URL:http://wftp3.itu.int/av-arch/jctvc-site/,, No. JCTVC0D125, Jan. 15, 2011, all pages.

Guillaume Laroche et al.: "On memory compression for motion vector prediction", 20110310, No. JCTVCOE221, Mar. 10, 2011, all pages.

Jung J et al.: "Temporal MV predictor modification for MV-Comp, Skip, Direct and Merge schemes", 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11and ITU-T SG.16); URL:http://wftp3.itu.int/av-arch/jctvc-site/,, No. JCTVC-D164, Jan. 15, 2011, all pages.

Li (USTC) B et al.: "Constrained temporal motion vector prediction for error resilience", 95. MPEG Meeting; Jan. 24, 2011-Jan. 28, 2011; Daegu; (Motion Picture Expert Group or ISO/IEC JTC1/SC29/WG11),, No. m18891, Jan. 23, 2011, all pages.

Patent Cooperation Treaty, International Search Report and Written Opinion of the International Searching Authority for International Application No. PCT/US2012/065699, Jan. 25, 16 pages.

Bross B et al: "WD4: Working Draft 4 of High-Efficiency Video Coding", 6. JCT-VC Meeting; 97, MPEG Meeting; Jul. 14, 2011-Jul. 22, 2011; Torino; (Joint Collaborative Team on Video Coding of ISO/IEC JTC1/SC29/WG11 and ITU-T SG. 16); URL:http://wftp3.itu.int/av-arch/jctvc-site/, No. JCTVC-F803, Sep. 8, 2011, all pages.

Bross B et al: "High Efficiency Video Coding (HEVC) text specification draft 6", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-H1003, Feb. 10, 2012, all pages.

Yu Y et al.: "The Reference Picture Construction of Combined List for HEVC",7. JCT-VC Meeting; 98. MPEG Meeting; Nov. 21, 2011-Nov. 30, 2011;Geneva;(Joint Collaborative Team on Video Coding of ISO/IEC JTC1/SC29/WG11 and ITU-T SG.16); URL:http://wftp3.itu.int/av-arch/jctvc-site/, No. JCT-G717,Nov. 10, 2011.

Byeong-Moon Jeon. Alexixs Michael Tourapis:"B pictures in JVT" 4. JVT Meeting; 61.MPEG Meeting; Jul. 22, 2002-Jul. 26, 2002; Klagenfurt. AT; (Joint Video Team of ISO/IEC JTCI/SC29/WG11 and ITU-T SG.16), No. JVT-DI55. Jul. 26, 2002, PX030005418.

Fang S et al.: "The Construction of Combined List for HEVC",6. JCT-VC Meeting; 97. MPEG Meeting; Jul. 14, 2011-Jul. 22, 2011;Torino;(Joint Collaborative Team on Video Coding of ISO/IEC JTC1/SC29/WG11 and ITU-T SG.16); URL:http://wftp3.itu.int/av-arch/jctvc-site/, No. JCTVC-F573. Jul. 16, 2011.

Hellman T et al.: "Limiting Collocated Temporal Reference to One Per Picture", Joint Collabortive Team on Video Coding of ISO/IEC JTC1/SC29/WG11 and ITU-T SG. 16, No. JCTVC-H0442, Jan. 20, 2012, JCT-VC Meeting; 99, MPEG Meeting; Feb. 1, 2012-Feb. 10, 2012; San Jose Retrieved from the Internet: URL:http://wftp3.itu.int/av-arch/jctvc-site/[retrieved on May 23, 2013], all pages.

I-K Kim et al.:"Restriction on motion vector scaling for Merge and AMVP", 8. JCT-VC Meeting; 98. MPEG Meeting; Nov. 21, 2011-Nov. 28, 2011; Geneva; (Joint Collaborative Team on Video Coding of Iso/IEC JTCI/SC29/WG11 and ITU-T-SG.16);URL:http://wftp3.itu.int/av-arch/jctvc-site/, No. JCTVC-G551. Nov. 8, 2011 XP030110535.

ISR and Written Opinion of the International Searching Authority for International Application No. PCTUS2012066146, Feb. 20, 2013, 15 pages.

ISR & Written Opinion RE: application PCTUS2012070871 dated Mar. 19, 2013, 15 pages.

ISR and Written Opinion of the International Searching Authority for International Application No. PCTUS2012065850, Feb. 27, 2013, 17 pages.

ISR, "ISR Search Report and Written Opinion of the International Searching Authority" for International Application No. ISR/US2013055968 dated Nov. 22, 2013 , 9 pages.

ISR, & Written Opinion of the International Searching Authority for International Application No. ISR/US2013024294, Jul. 3, 2013, 13 pages.

ISR, & Written Opinion of the International Searching Authority for International Application No. ISR/US2013025988, May 14, 2013, 11 pages.

ISR, & Written Opinion of the International Searching Authority for International Application No. ISR/US2013025994, May 15, 2013, 12 pages.

ISR, & Written Opinion of the International Searching Authority for International Application No. ISR/US2013054965, Oct. 22, 2013, 12 pages.

Jian-Liang Lin et al.:"Motion vector coding techniques for HEVC", Multimedia Signal Processing (MMSP), 2011 IEE 13th International Workshop on. IEEE Oct. 17, 2011. pp. 1-6, XP03202755.

J-L Lin et al.: "Syntax for AMVP Parsing Error Control", 95. MPEG Meeting; Jan. 24, 2011-Jan. 28, 2011; Daegu; (Motion Ipcture Expert Group or ISO/IEC JTC1/SC29/WG11),, No. m18878, Jan. 23, 2011, all pages.

Li (USTC) B et al.: "High-level Syntax: Marking process for non-TMVP pictures", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG. 16); URL: http://wftp3.itu.int/av-arch/jctvc-site/,, No. JCTV-G398, Nov. 8, 2011, all pages.

(56) References Cited

OTHER PUBLICATIONS

Li (USTC) B et al: "Constrained temporal motion vector prediction for error resillience", 4. JCT-VC Meeting; 95. MPEG Meeting; Jan. 20, 2011-Jan. 28, 2011; Daegu; (Joint Collaborative Team on Video Coding of ISO/IEC JTC1/SC29/WT11 and ITU-T SG.16); URL:http://wftp3.itu.int/av-arch/jctvc-site/,, No. JCTVC-D139, Jan. 15, 2011, all pages.

Li et al.,"Redundancy reduction in B-Frame coding at temporal level zero" Joint Collaborative Team on Video Coding (JCT-VC) of ITU-T SG16 WP3 and ISO/IEC JTC1/SC29/WG11; 3rd Meeting: Guangzhou, CN; Oct. 7-15, 2010; 6 pages.

Lim C S et al.: "High-level Syntax: Proposed fix on signalling of TMVP disabling flag", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-I0420, Apr. 17, 2012, all pages.

Yu Y et al.: "Modifications on signalling collocated picture", 9. JCT-VC Meeting; 188. MPEG Meeting; Apr. 27, 2012-May 7, 2012; Geneva; (Joint Collaborative Team on Video Coding of ISO/IEC JTCI/SC29/WG11 and ITU-T SG.16);URL:http://wftp3.itu.int/av-arch/jctvc-site/, No. JCTVC-I0266. Apr. 17, 2012 XP030112029.

Yu Y et al.: "Modification of slice temporal mvp enable flag", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG. 16); URL:http://wftp3.itu.int/av-arch/jctvc-site/,, No. JCTVC-K0251, Oct. 2, 2012, all pages.

Sjaberg R et al.: Absolute signaling of reference pictures, 6. JCT-VC Meeting; 97. MPEG Meeting; Jul. 14, 2011-Jul. 22, 2011; Torino;(Joint Collaborative Team on Video Coding of ISO/IEC JTCI/SG29/WG11 and ITU-T SG.16);URL:http://wftp3.itu.int/av-arch/jctvc-site/, No. JCTVC-F493. Jul. 22, 2011 XP030009516.

Suzuki et al., "Extension of uni-prediction simplification in B slices" Joint Collaborative Team on Video Coding (JCT-VC) of ITU-T SG16 WP3 and ISO/IEC JTC1/SC29/WG11; 4th Meeting: Daegu. Lorea; Jan. 20-28, 2011; 8 pages.

Toshiyasu Sugio et al.: CE9: Experiment A, I, J and S Modified derivation processof reference index for skip mode and temporal motion vector predictor 20110318, No. JCTVC-E230, Mar. 18, 2011.

Wahadaniah V et al.: "AHG14/AHG15/non-CE9: Loss robustness issue in TMVP disabling", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG. 16); URL: http://wftp3.itu.int/av-arch/jctvc-site/,, No. JCTVC-H0570, Jan. 21, 2012, all pages.

W-S Kim et al.: "Non-CE8: Method of visual coding artifact removal for SAO"> 7. JCT-VC Meeting; 98. MPEG Meeting; Nov. 21, 2011-Nov. 30, 2011; Geneva; (Joint Collaborative Team on Video Coding of ISO-IEC JTC1/SC29/WG11 and ITU-T SG.16),, URL: http://wftp3.itu.int/av-arch/jctvc-site/,, No. JCTVC-G680, Nov. 9, 2011, all pages.

Yu Y et al.: "AHG21: The Improvements on Reference Picture Buffering and List Construction", Joint Collaborative Team on Video Coding of ISO/IEC JTC1/SC29/WG11 and ITU-T SG.16, No. JCTVC-G717-r1, Nov. 24, 2011, JCT-VC Meeting; Nov. 21, 2011-Nov. 30, 2011 Geneva; 98, MPEG Meeting retrieved from the Internet: URL:http://wftp3.itu.int/av-arch/jctvc-site/2011_11_g_geneva/[retrieved on May 23, 2013], all pages.

Yu Y et al.: "Implicit Signaling of collocated picture for HEVC", 99.MPEG Meeting; Feb. 6, 2012-Feb. 18, 2012; San Josa CR; (Motion Picture Expert Group or ISO/IEC JTCI/SC29/WG11), No. m23429, Jun. 7, 2012 XP030051954.

Bross, Benjamin et al.: "High Efficiency Video Coding (HEVC) text specification draft 7," Joint Collaborative Team on Video Coding(JCT-VC) of ISO/IEC JTC1/SC29/WG11 and ITU-T SG16 WP3, 9th Meeting : Geneva, CH, Apr. 27-May 7, 2012, JCTVC-I1003_d9, 278 pages.

Philippe Bordes et al.: "AHG9: Simplification of weighted prediction signaling in PPS," 10. JCT-VC Meeting; 101. Mpeg Meeting; Jul. 11, 2012-Jul. 20, 2012; Stockholm; (Joint Collaborative Team on Video Coding of ISO/IEC JTC1/SC29/WG11 and ITU-T SG16); URL: http://wftp3.itu.int/av-arch/jctvc-site/. No. JCTVC-J0504, Jul. 12, 2012, all pages.

IPRP, & Written Opinion of the International Searching Authority for International Application No. ISR/US2013054965, Feb. 15, 2015, 8 pages.

Ericsson, "Absolute signaling of reference pictures," JCTVC-F493 WG11 Number: m20923, JCT-VC of ITU-T SG16 WP3 and ISO/IEC JTC1/SC29/VVG11, 6th (JCTVCF493) Meeting: Torino (2011).

Korean Office Action dated Aug. 12, 2015 in related matter. 11 pages.KR10-214-7013280 (GOGL-1075B-KR).

Motorola Mobility, "The Construction of Combined List for HEVC," JCTVC-F573-r2, JCT-VC of ITU-T SG16 WP3 and ISO/IEC JTC1/SC29NVG11, 6th (JCTVCF573) Meeting: Torino, IT (Jul. 14-22, 2011).

Samsung Electronics Co., Ltd., "Restriction on motion vector scaling for Merge and Amvp," JCTVC-G551, JCT-VC of ITU-T SG16 WP3 and ISO/IEC JTC1/SC29/WG11, 7th (JCTVCG551) Meeting: Geneva, CH (Nov. 21-30, 2011).

\* cited by examiner

EFFICIENT STORAGE OF MOTION INFORMATION FOR HIGH EFFICIENCY VIDEO CODING

CROSS-REFERENCE TO RELATED APPLICATIONS

This application claims benefit of U.S. Provisional Patent Application No. 61/562,418, entitled "NEW MEMORY COMPRESS OF COLLOCATED PICTURE FOR HEVC," by Yue Yu, Krit Panusopone and Limin Wang, filed Nov. 21, 2011; U.S. Provisional Patent Application No. 61/561,779, entitled "MEMORY COMPRESS OF COLLOCATED PICTURE FOR HEVC," by Yue Yu, Krit Panusopone and Limin Wang, filed Nov. 18, 2011; and U.S. Provisional Patent Application No. 61/595,141, entitled "EFFECTIVE WAY FOR SIGNALING COLLOCATED PICTURE FOR HEVC," by Yue Yu, Krit Panusopone and Limin Wang, filed Feb. 5, 2012, all of which applications are hereby incorporated by reference herein.

BACKGROUND OF THE INVENTION

1. Field of the Invention

The present invention relates to systems and methods for encoding data, and in particular to a system and method for storing motion and retrieving data associated with high efficiency video coded data.

2. Description of the Related Art

There is rapid growth in the technologies associated with the generation, transmission, and reproduction of media programs. These technologies include coding schemes that permit digital versions of the media programs to be encoded to compress them to much smaller size and facilitate their transmission, storage, reception and playback. These technologies have application in personal video recorders (PVRs), video on demand (VOD), multiple channel media program offerings, interactivity, mobile telephony, and media program transmission.

Without compression, digital media programs are typically too large to transmit and/or store for a commercially acceptable cost. However, compression of such programs has made the transmission and storage of such digital media programs not only commercially feasible, but commonplace.

Initially, the transmission of media programs involved low to medium resolution images transmitted over high bandwidth transmission media such as cable television and satellite. However, such transmission has evolved to include lower bandwidth transmission media such as Internet transmission to fixed and mobile devices via computer networks, WiFi, Mobile TV and third and fourth generation (3G and 4G) networks. Further, such transmissions have also evolved to include high definition media programs such as high definition television (HDTV), which have significant transmission bandwidth and storage requirements.

The encoding and decoding of compressed video signals typically involves the storage and retrieval of large volumes of data by both the encoder of the signals and the decoder of the signals. As a consequence, such encoders and decoders require increased storage and processing capacity. What is needed is a system and method that reduces the storage and processing required in the encoder and decoder. The present invention satisfies this need.

SUMMARY OF THE INVENTION

To address the requirements described above, this document discloses a method, apparatus, article of manufacture, and a memory structure for signaling the storage of motion information describing the depicted motion associated with digital pictures. In one embodiment, the method comprises coding a first picture of the sequence of the plurality of digital pictures to produce first motion information, the first motion information describing the motion and associated with the first picture, determining if the first motion information should replace second motion information describing the motion and associated with a second digital picture coded temporally previous to the coding of the first picture and if the first motion information should replace the second motion information, replacing the second motion information with the first motion information in the memory and providing the bit stream having first motion signaling information having a first value, while if the first motion information should not replace the second motion information, retaining the second motion information in the memory and providing the bit stream having the first motion signaling information having a second value.

In another embodiment, the method comprises decoding a first picture of the sequence of the plurality of digital pictures according to second motion information stored in a memory to produce first motion information associated with the first picture, the second motion information describing the motion and associated with a second digital picture decoded temporally previous to the decoding of the first digital picture, and replacing the second motion information in the memory with the first motion information only if the first motion signaling information associated with the first picture has a first value and retaining the second motion information in the memory if the first motion signaling information has a second value.

Further embodiments comprise an apparatus for performing the foregoing methods, evidenced, for example, by a processor communicatively coupled to a memory storing instructions comprising instructions for performing the foregoing operations.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Audio-Visual Information Transception and Storage

Figure 1:
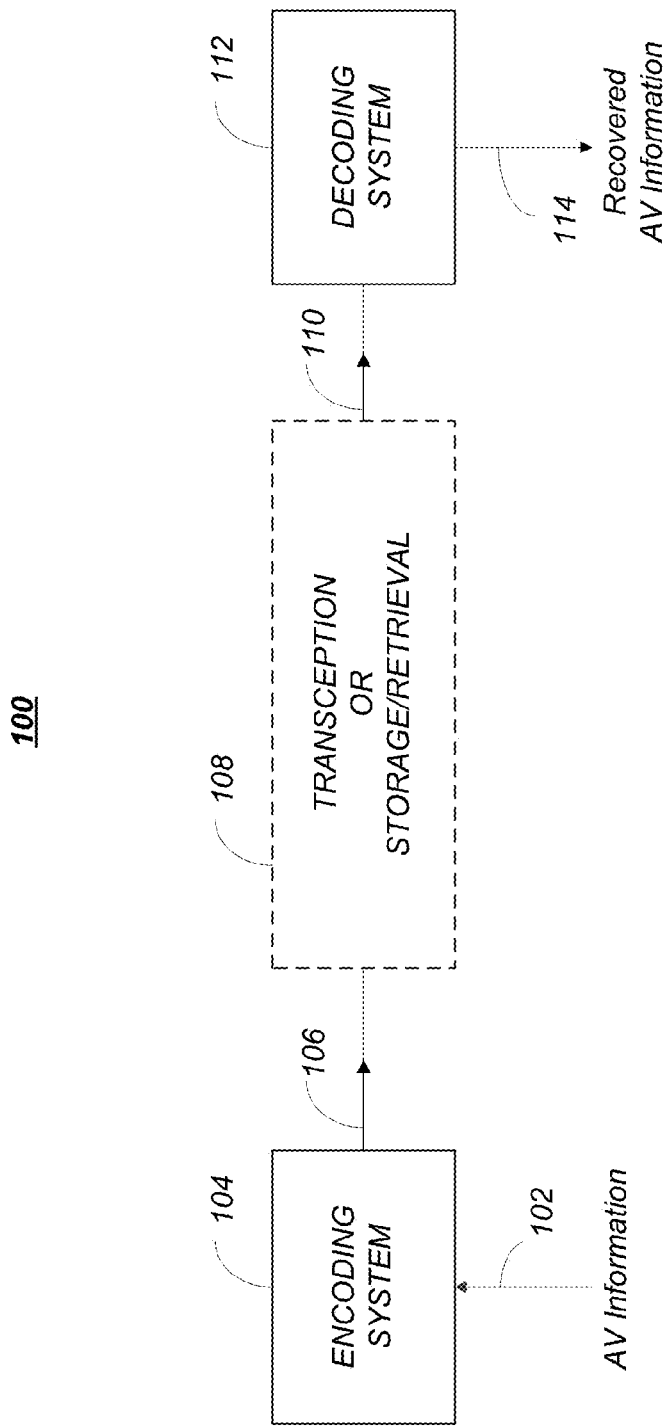
FIG. 1 is a diagram depicting an exemplary embodiment of a video coding-decoding system that can be used for transmission and/or storage and retrieval of audio and/or video information.

FIG. 1 is a diagram depicting an exemplary embodiment of a video coding-decoding (codec) system 100 that can be used for transmission and/or storage and retrieval of audio and/or video information. The codec system 100 comprises an encoding system 104, which accepts audio-visual (AV) information 102 and processes the AV information 102 to generate encoded (compressed) AV information 106, and a decoding system 112, which processes the encoded AV information 106 to produce recovered AV information 114. Since the encoding and decoding processes are not lossless, the recovered AV information 114 is not identical to the initial AV information 102, but with judicious selection of the encoding processes and parameters, the differences between the recovered AV information 114 and the unprocessed AV information 102 are acceptable to human perception.

The encoded AV information 106 is typically transmitted or stored and retrieved before decoding and presentation, as performed by transception (transmission and reception) or storage/retrieval system 108. Transception losses may be significant, but storage/retrieval losses are typically minimal or non-existent, hence, the transcepted AV information 110 provided to the decoding system 112 is typically the same as or substantially the same as the encoded AV information 106.

Figure 2A:
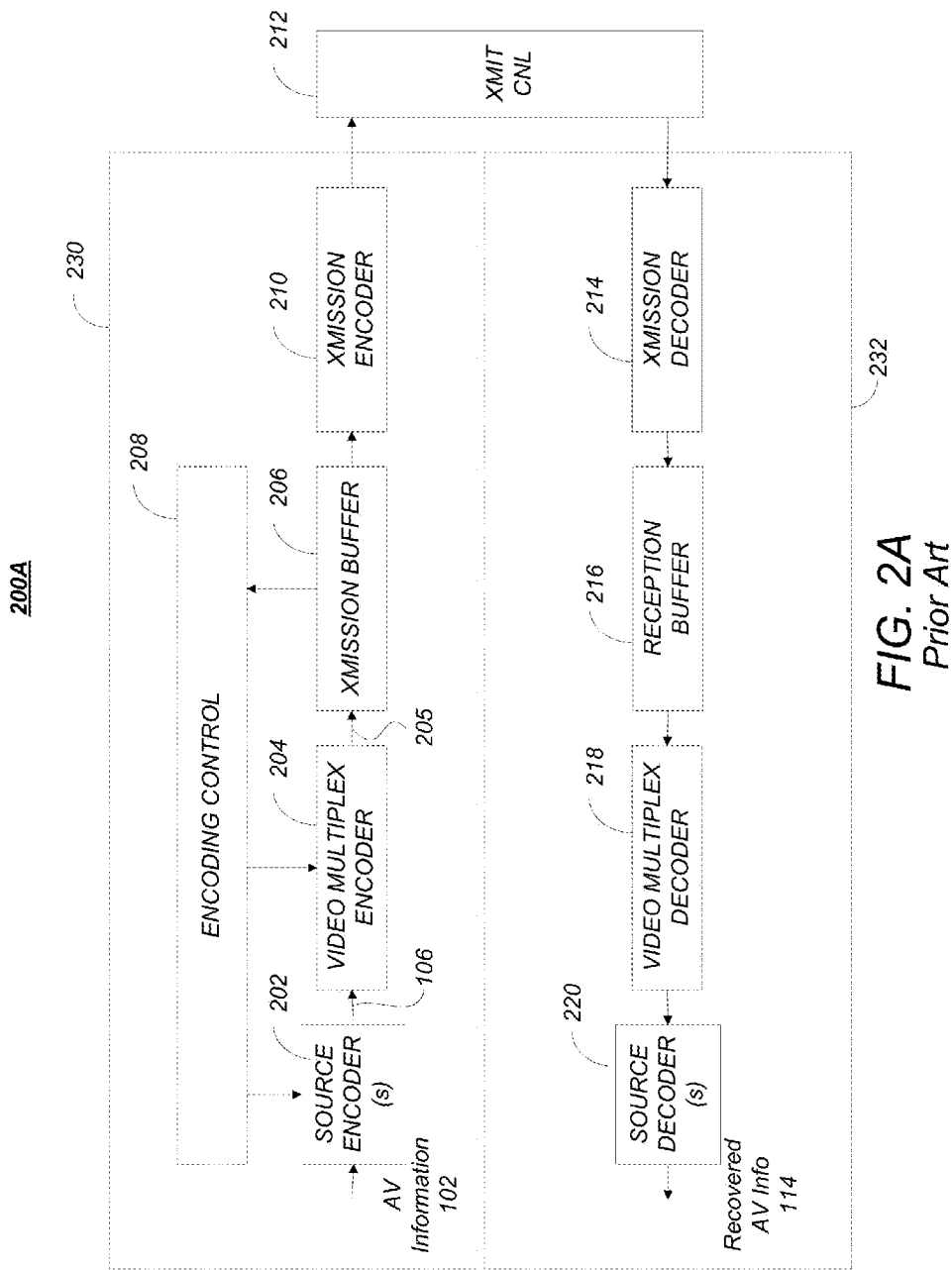
FIG. 2A is a diagram of one embodiment of a codec system 200A in which the encoded AV information is transmitted to and received at another location.

FIG. 2A is a diagram of one embodiment of a codec system 200A in which the encoded AV information 106 is transmitted to and received at another location. A transmission segment 230 converts an input AV information 102 into a signal appropriate for transmission and transmits the converted signal over the transmission channel 212 to the reception segment 232. The reception segment 232 receives the transmitted signal, and converts the received signal into the recovered AV information 114 for presentation. As described above, due to coding and transmission losses and errors, the recovered AV information 114 may be of lower quality than the AV information 102 that was provided to the transmission segment 230. However, error correcting systems may be included to reduce or eliminate such errors. For example, the encoded AV information 106 may be forward error correction (FEC) encoded by adding redundant information, and such redundant information can be used to identify and eliminate errors in the reception segment 230.

The transmission segment 102 comprises one or more source encoders 202 to encode multiple sources of AV information 102. The source encoder 202 encodes the AV information 102 primarily for purposes of compression to produce the encoded AV information 106, and may include, for example a processor and related memory storing instructions implementing a codec such as MPEG-1, MPEG-2, MPEG-4 AVC/H.264, HEVC or similar codec, as described further below.

The codec system 200A may also include optional elements indicated by the dashed lines in FIG. 2A. These optional elements include a video multiplex encoder 204, an encoding controller 208, and a video demultiplexing decoder 218. The optional video multiplex encoder 204 multiplexes encoded AV information 106 from an associated plurality of source encoder(s) 202 according to one or more parameters supplied by the optional encoding controller 208. Such multiplexing is typically accomplished in the time domain and is data packet based.

In one embodiment, the video multiplex encoder 204 comprises a statistical multiplexer, which combines the encoded AV information 106 from a plurality of source encoders 202 so as to minimize the bandwidth required for transmission. This is possible, since the instantaneous bit rate of the coded AV information 106 from each source encoder 202 can vary greatly with time according to the content of the AV information 102. For example, scenes having a great deal of detail and motion (e.g. sporting events) are typically encoded at higher bitrates than scenes with little motion or detail (e.g. portrait dialog). Since each source encoder 202 may produce information with a high instantaneous bitrate while another source encoder 202 produces information with a low instantaneous bit rate, and since the encoding controller 208 can command the source encoders 202 to encode the AV information 106 according to certain performance parameters that affect the instantaneous bit rate, the signals from each of the source encoders 106 (each having a temporally varying instantaneous bit rate) can be combined together in an optimal way to minimize the instantaneous bit rate of the multiplexed stream 205.

As described above, the source encoder 202 and the video multiplex coder 204 may optionally be controlled by a coding controller 208 to minimize the instantaneous bit rate of the combined video signal. In one embodiment, this is accomplished using information from a transmission buffer 206 which temporarily stores the coded video signal and can indicate the fullness of the buffer 206. This allows the coding performed at the source encoder 202 or video multiplex coder 204 to be a function of the storage remaining in the transmission buffer 206.

The transmission segment 230 also may comprise a transmission encoder 210, which further encodes the video signal for transmission to the reception segment 232. Transmission encoding may include for example, the aforementioned FEC coding and/or coding into a multiplexing scheme for the transmission medium of choice. For example, if the transmission is by satellite or terrestrial transmitters, the transmission encoder 114 may encode the signal into a signal constellation before transmission via quadrature amplitude modulation (QAM) or similar modulation technique. Also, if the encoded video signal is to be streamed via an Internet protocol device and the Internet, the transmission encodes the signal according to the appropriate protocol. Further, if the encoded signal is to be transmitted via mobile telephony, the appropriate coding protocol is used, as further described below.

The reception segment 232 comprises a transmission decoder 214 to receive the signal that was coded by the transmission coder 210 using a decoding scheme complementary to the coding scheme used in the transmission encoder 214. The decoded received signal may be temporarily stored by optional reception buffer 216, and if the received signal comprises multiple video signals, the received signal is multiplex decoded by video multiplex decoder 218 to extract the video signal of interest from the video signals multiplexed by the video multiplex coder 204. Finally, the video signal of interest is decoded by source decoder 220 using a decoding scheme or codec complementary to the codec used by the source encoder 202 to encode the AV information 102.

In one embodiment, the transmitted data comprises a packetized video stream transmitted from a server (representing the transmitting segment 230) to a client (representing the receiving segment 232). In this case, the transmission encoder 210 may packetize the data and embed network abstract layer (NAL) units in network packets. NAL units define a data container that has header and coded elements, and may correspond to a video frame or other slice of video data.

The compressed data to be transmitted may packetized and transmitted via transmission channel 212, which may include a Wide Area Network (WAN) or a Local Area Network (LAN). Such a network may comprise, for example, a wireless network such as Wifi, an Ethernet network, an Internet network or a mixed network composed of several different networks. Such communication may be affected via a communication protocol, for example Real-time Transport Protocol (RTP), User Datagram Protocol (UDP) or any other type of communication protocol. Different packetization methods may be used for each network abstract layer (NAL) unit of the bitstream. In one case, one NAL unit size is smaller than the maximum transport unit (MTU) size corresponding to the largest packet size that can be transmitted over the network without being fragmented. In this case, the NAL unit is embedded into a single network packet. In another case, multiple entire NAL units are included in a single network packet. In a third case, one NAL unit may be too large to be transmitted in a single network packet and is thus split into several fragmented NAL units with each fragmented NAL unit being transmitted in an individual network packet. Fragmented NAL unit are typically sent consecutively for decoding purposes.

The reception segment 232 receives the packetized data and reconstitutes the NAL units from the network packet. For fragmented NAL units, the client concatenates the data from the fragmented NAL units in order to reconstruct the original NAL unit. The client 232 decodes the received and reconstructed data stream and reproduces the video images on a display device and the audio data by a loud speaker.

Figure 2B:
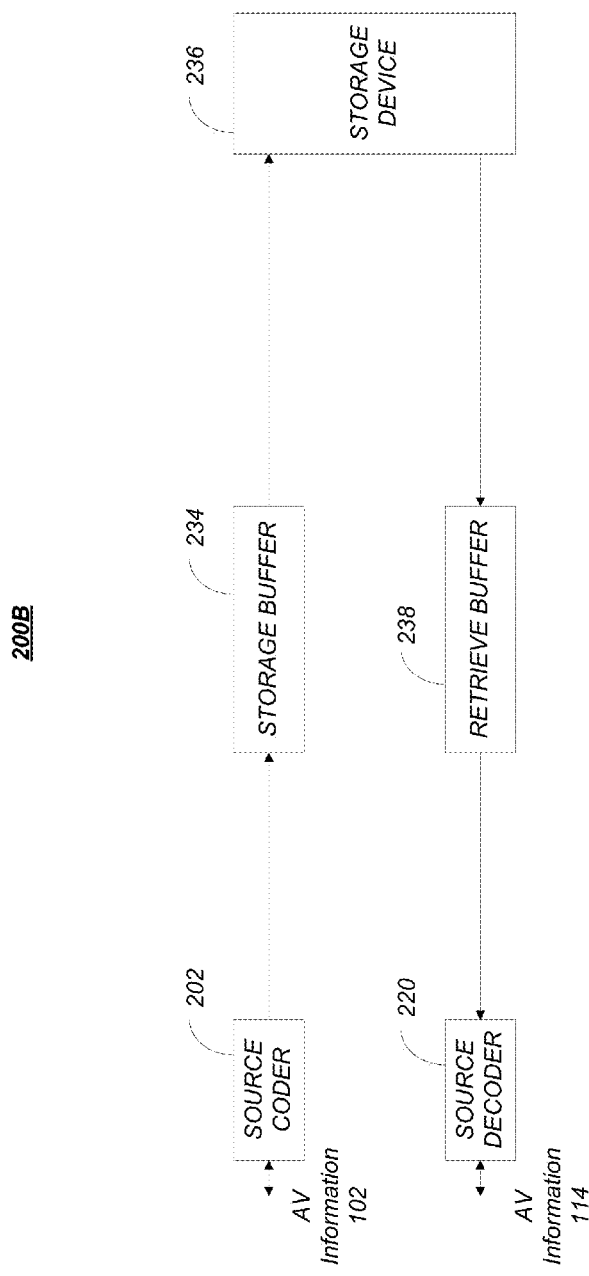
FIG. 2B is a diagram depicting an exemplary embodiment of codec system in which the encoded information is stored and later retrieved for presentation, hereinafter referred to as codec storage system.

FIG. 2B is a diagram depicting an exemplary embodiment of codec system in which the encoded information is stored and later retrieved for presentation, hereinafter referred to as codec storage system 200B. This embodiment may be used, for example, to locally store information in a digital video recorder (DVR), a flash drive, hard drive, or similar device. In this embodiment, the AV information 102 is source encoded by source encoder 202, optionally buffered by storage buffer 234 before storage in a storage device 236. The storage device 236 may store the video signal temporarily or for an extended period of time, and may comprise a hard drive, flash drive, RAM or ROM. The stored AV information is then retrieved, optionally buffered by retrieve buffer 238 and decoded by the source decoder 220.

Figure 2C:
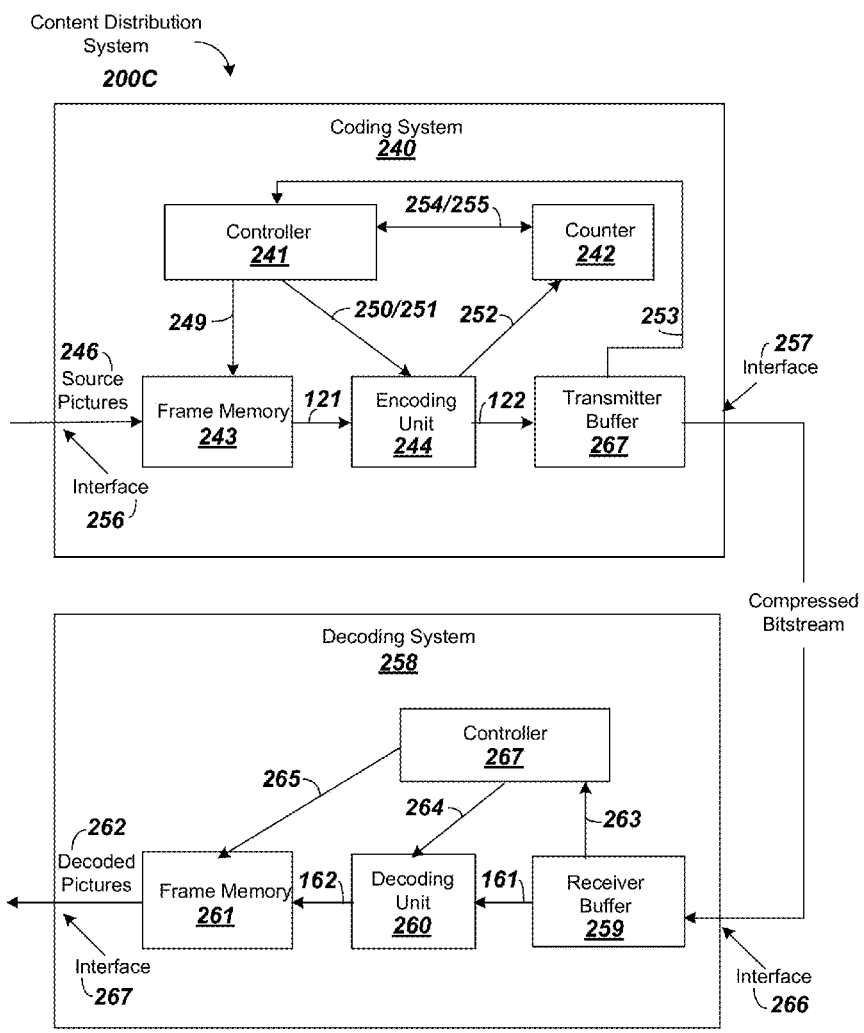
FIG. 2C is a diagram depicting an exemplary content distribution system 200C comprising a coding system 240 and a decoding system 258 that can be used to transmit and receive HEVC data.

FIG. 2C is another diagram depicting an exemplary content distribution system 200C comprising a coding system or encoder 202 and a decoding system or decoder 220 that can be used to transmit and receive HEVC data. In some embodiments, the coding system 202 can comprise an input interface 256, a controller 241 a counter 242 a frame memory 243, an encoding unit 244, a transmitter buffer 267 and an output interface 257. The decoding system 220 can comprise a receiver buffer 259, a decoding unit 260, a frame memory 261 and a controller 267. The coding system 202 and the decoding system 220 can be coupled with each other via a transmission path which can carry a compressed bit stream. The controller 241 of the coding system 202 can control the amount of data to be transmitted on the basis of the capacity of the transmitter buffer 267 or receiver buffer 259 and can include other parameters such as the amount of data per a unit of time. The controller 241 can control the encoding unit 244 to prevent the occurrence of a failure of a received signal decoding operation of the decoding system 220. The controller 241 can be a processor or include, by way of a non-limiting example, a microcomputer having a processor, a random access memory and a read only memory.

Source pictures 246 supplied from, by way of a non-limiting example, a content provider can include a video sequence of frames including source pictures in a video sequence. The source pictures 246 can be uncompressed or compressed. If the source pictures 246 are uncompressed, the coding system 202 can have an encoding function. If the source pictures 246 are compressed, the coding system 202 can have a transcoding function. Coding units can be derived from the source pictures utilizing the controller 241. The frame memory 243 can have a first area that can be used for storing the incoming frames from the source pictures 246 and a second area that can be used for reading out the frames and outputting them to the encoding unit 244. The controller 241 can output an area switching control signal 249 to the frame memory 243. The area switching control signal 249 can indicate whether the first area or the second area is to be utilized.

The controller 241 can output an encoding control signal 250 to the encoding unit 244. The encoding control signal 250 can cause the encoding unit 202 to start an encoding operation, such as preparing the Coding Units based on a source picture. In response to the encoding control signal 250 from the controller 241, the encoding unit 244 can begin to read out the prepared Coding Units to a high-efficiency encoding process, such as a prediction coding process or a transform coding process which process the prepared Coding Units generating video compression data based on the source pictures associated with the Coding Units.

The encoding unit 244 can package the generated video compression data in a packetized elementary stream (PES) including video packets. The encoding unit 244 can map the video packets into an encoded video signal 248 using control information and a program time stamp (PTS) and the encoded video signal 248 can be transmitted to the transmitter buffer 267.

The encoded video signal 248, including the generated video compression data, can be stored in the transmitter buffer 267. The information amount counter 242 can be incremented to indicate the total amount of data in the transmitter buffer 267. As data is retrieved and removed from the buffer, the counter 242 can be decremented to reflect the amount of data in the transmitter buffer 267. The occupied area information signal 253 can be transmitted to the counter 242 to indicate whether data from the encoding unit 244 has been added or removed from the transmitter buffer 267 so the counter 242 can be incremented or decremented. The controller 241 can control the production of video packets produced by the encoding unit 244 on the basis of the occupied area information 253 which can be communicated in order to anticipate, avoid, prevent, and/or detect an overflow or underflow from taking place in the transmitter buffer 267.

The information amount counter 242 can be reset in response to a preset signal 254 generated and output by the controller 241. After the information amount counter 242 is reset, it can count data output by the encoding unit 244 and obtain the amount of video compression data and/or video packets which have been generated. The information amount counter 242 can supply the controller 241 with an information amount signal 255 representative of the obtained amount of information. The controller 241 can control the encoding unit 244 so that there is no overflow at the transmitter buffer 267.

In some embodiments, the decoding system 220 can comprise an input interface 266, a receiver buffer 259, a controller 267, a frame memory 261, a decoding unit 260 and an output interface 267. The receiver buffer 259 of the decoding system 220 can temporarily store the compressed bit stream, including the received video compression data and video packets based on the source pictures from the source pictures 246. The decoding system 220 can read the control information and presentation time stamp information associated with video packets in the received data and output a frame number signal 263 which can be applied to the controller 220. The controller 267 can supervise the counted number of frames at a predetermined interval. By way of a non-limiting example, the controller 267 can supervise the counted number of frames each time the decoding unit 260 completes a decoding operation.

In some embodiments, when the frame number signal 263 indicates the receiver buffer 259 is at a predetermined capacity, the controller 267 can output a decoding start signal 264 to the decoding unit 260. When the frame number signal 263 indicates the receiver buffer 259 is at less than a predetermined capacity, the controller 267 can wait for the occurrence of a situation in which the counted number of frames becomes equal to the predetermined amount. The controller 267 can output the decoding start signal 263 when the situation occurs. By way of a non-limiting example, the controller 267 can output the decoding start signal 264 when the frame number signal 263 indicates the receiver buffer 259 is at the predetermined capacity. The encoded video packets and video compression data can be decoded in a monotonic order (i.e., increasing or decreasing) based on presentation time stamps associated with the encoded video packets.

In response to the decoding start signal 264, the decoding unit 260 can decode data amounting to one picture associated with a frame and compressed video data associated with the picture associated with video packets from the receiver buffer 259. The decoding unit 260 can write a decoded video signal 269 into the frame memory 261. The frame memory 261 can have a first area into which the decoded video signal is written, and a second area used for reading out decoded pictures 262 to the output interface 267.

In various embodiments, the coding system 202 can be incorporated or otherwise associated with a transcoder or an encoding apparatus at a headend and the decoding system 220 can be incorporated or otherwise associated with a downstream device, such as a mobile device, a set top box or a transcoder.

Source Encoding/Decoding

As described above, the encoders 202 employ compression algorithms to generate bit streams and/or files of smaller size than the original video sequences in the AV information 102. Such compression is made possible by reducing spatial and temporal redundancies in the original sequences.

Prior art encoders 202 include those compliant with the video compression standard H.264/MPEG-4 AVC ("Advanced Video Coding") developed by between the "Video Coding Expert Group" (VCEG) of the ITU and the "Moving Picture Experts Group" (MPEG) of the ISO, in particular in the form of the publication "Advanced Video Coding for Generic Audiovisual Services" (March 2005), which is hereby incorporated by reference herein.

HEVC "High Efficiency Video Coding" (sometimes known as H.265) is expected to replace the H.264/MPEG-4 AVC. HEVC introduces new coding tools and entities that are generalizations of the coding entities defined in H.264/AVC, as further described below. CS39543/CS39549/CS39892

Figure 3:
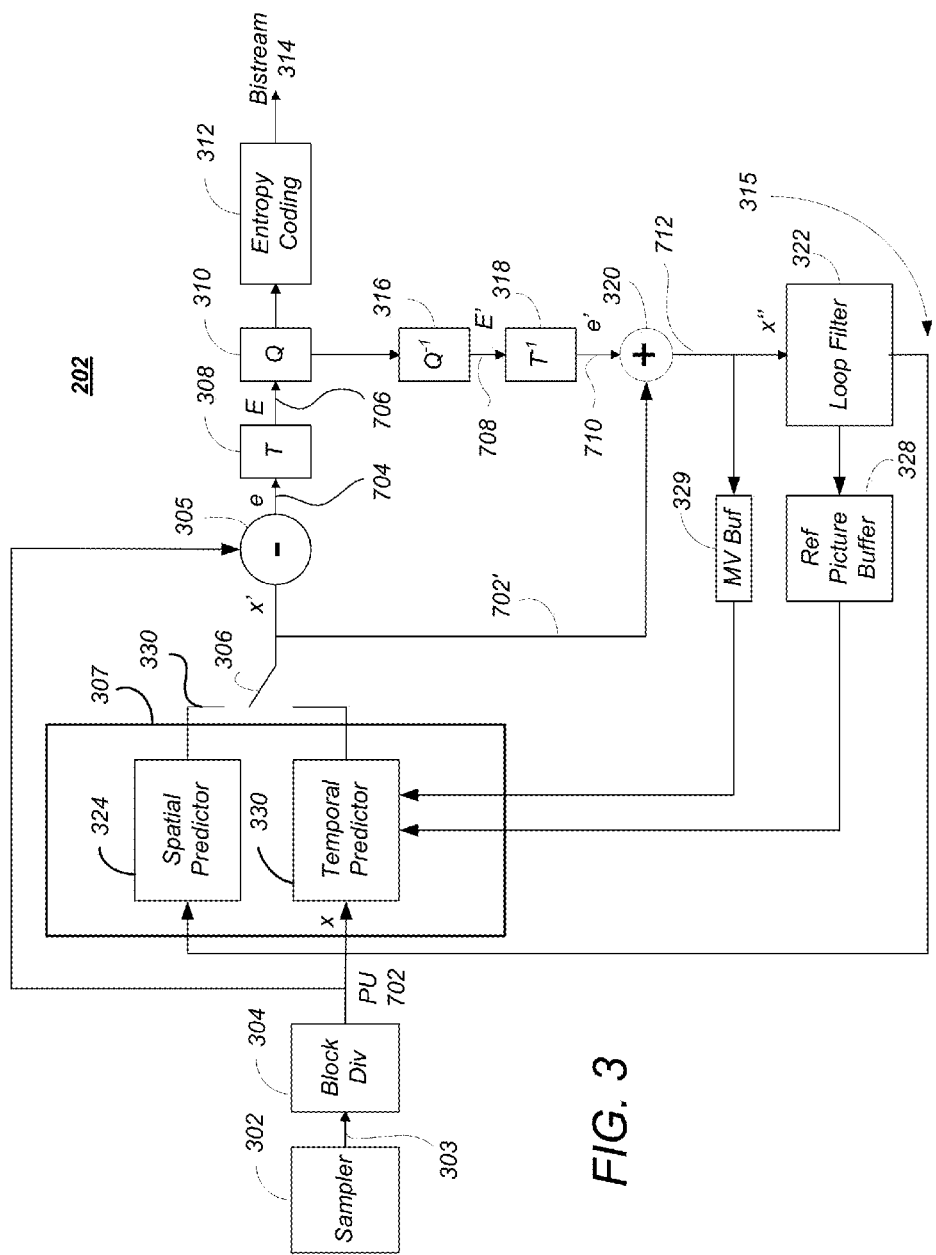
FIG. 3 is a block diagram illustrating one embodiment of the source encoder.

FIG. 3 is a block diagram illustrating one embodiment of the source encoder 202. The source encoder 202 accepts AV information 102 and uses sampler 302 sample the AV information 102 to produce a sequence 303 of successive of digital images or pictures, each having a plurality of pixels. A picture can comprise a frame or a field, wherein a frame is a complete image captured during a known time interval, and a field is the set of odd-numbered or even-numbered scanning lines composing a partial image.

The sampler 302 produces an uncompressed picture sequence 303. Each digital picture can be represented by one or more matrices having a plurality of coefficients that represent information about the pixels that together comprise the picture. The value of a pixel can correspond to luminance or other information. In the case where several components are associated with each pixel (for example red-green-blue components or luminance-chrominance components), each of these components may be separately processed.

Images can be segmented into "slices," which may comprise a portion of the picture or may comprise the entire picture. In the H.264 standard, these slices are divided into coding entities called macroblocks (generally blocks of size 16 pixels×16 pixels) and each macroblock may in turn be divided into different sizes of data blocks 102, for example 4×4, 4×8, 8×4, 8'8, 8×16, 16×8. HEVC expands and generalizes the notion of the coding entity beyond that of the macroblock.

HEVC Coding Entities: CTU, CU, PU and TU

Like other video coding standards, HEVC is a block-based hybrid spatial and temporal predictive coding scheme. However, HEVC introduces new coding entities that are not included with H.264/AVC standard. These coding entities include (1) Coding tree block (CTUs), coding units (CUs), the predictive units (PUs) and transform units (TUs) and are further described below.

Figure 4:
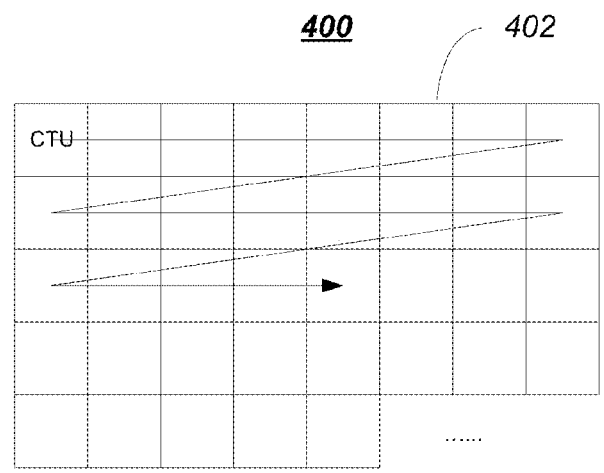
FIG. 4 is a diagram depicting a picture of AV information, such as one of the pictures in the picture sequence.

FIG. 4 is a diagram depicting a picture 400 of AV information 102, such as one of the pictures in the picture sequence 303. The picture 400 is spatially divided into non-overlapping square blocks known as coding tree units(s), or CTUs 402. Unlike H.264 and previous video coding standards where the basic coding unit is macroblock of 16×16 pixels, the CTU 402 is the basic coding unit of HEVC, and can be as large as 128×128 pixels. As shown in FIG. 4, the CTUs 402 are typically referenced within the picture 400 in an order analogous to a progressive scan.

Each CTU 402 may in turn be iteratively divided into smaller variable size coding units described by a "quadtree" decomposition further described below. Coding units are regions formed in the image to which similar encoding parameters are applied and transmitted in the bitstream 314.

Figure 5:
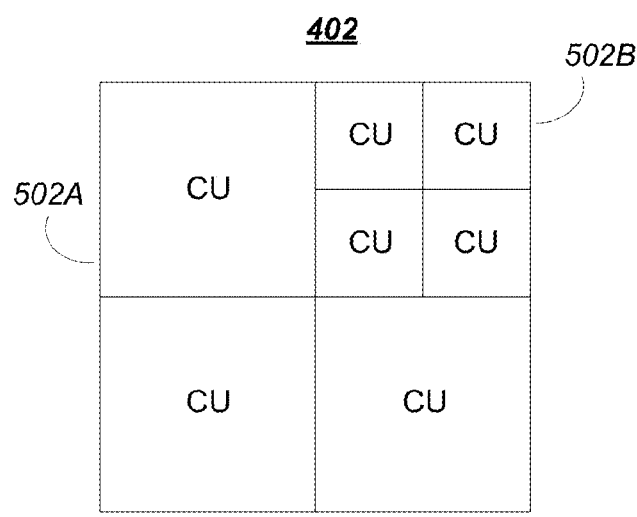
FIG. 5 is a diagram showing an exemplary partition of a coding tree block into coding units.

FIG. 5 is a diagram showing an exemplary partition of an CTU 402 into coding units (CUs) such as coding unit 502A and 502B (hereinafter alternatively referred to as coding unit(s) 502). A single CTU 402 can be divided into four CUs 502 such as CU 502A, each a quarter of the size of CTU 402. Each such divided CU 502A can be further divided into four smaller CUs 502B of quarter size of initial CU 502A.

The division of CTUs 402 into CUs 502A and into smaller CUs 502B is described by "quadtree" data parameters (e.g. flags or bits) that are encoded into the output bitstream 314 along with the encoded data as overhead known as syntax.

Figure 6:
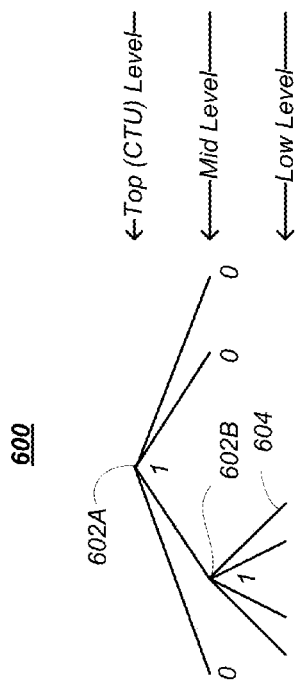
FIG. 6 is a diagram illustrating a representation of a representative quadtree and data parameters for the code tree block partitioning shown in FIG. 5.

FIG. 6 is a diagram illustrating a representation of a representative quadtree 600 and data parameters for the CTU 402 partitioning shown in FIG. 5. The quadtree 600 comprises a plurality of nodes including first node 602A at one hierarchical level and second node 602B at a lower hierarchical level (hereinafter, quadtree nodes may be alternatively referred to as "nodes" 602). At each node 602 of a quadtree, a "split flag" or bit "1" is assigned if the node 602 is further split into sub-nodes, otherwise a bit "0" is assigned.

For example, the CTU 402 partition illustrated in FIG. 5 can be represented by the quadtree 600 presented in FIG. 6, which includes a split flag of "1" associated with node 602A at the top CU 502 level (indicating there are 4 additional nodes at a lower hierarchical level). The illustrated quadtree 600 also includes a split flag of "1" associated with node 602B at the mid CU 502 level to indicate that this CU is also partitioned into four further CUs 502 at the next (bottom) CU level. The source encoder 202 may restrict the minimum and maximum CU 502 sizes, thus changing the maximum possible depth of the CU 502 splitting.

The encoder 202 generates encoded AV information 106 in the form of a bitstream 314 that includes a first portion having encoded data for the CUs 502 and a second portion that includes overhead known as syntax elements. The encoded data includes data corresponding to the encoded CUs 502 (i.e. the encoded residuals together with their associated motion vectors, predictors, or related residuals as described further below). The second portion includes syntax elements that may represent encoding parameters which do not directly correspond to the encoded data of the blocks. For example, the syntax elements may comprise an address and identification of the CU 502 in the image, a quantization parameter, an indication of the elected Inter/Intra coding mode, the quadtree 600 or other information.

CUs 502 correspond to elementary coding elements and include two related sub-units: prediction units (PUs) and a transform units (TUs), both of which have a maximum size equal to the size of the corresponding CU 502.

Figure 7:
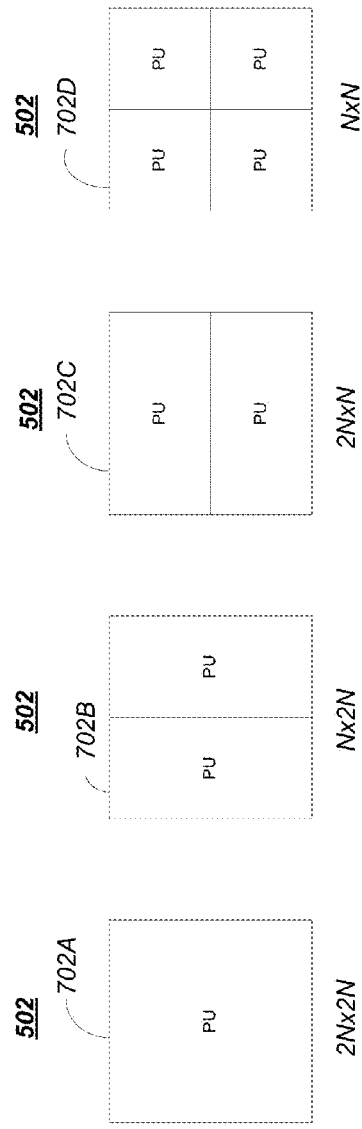
FIG. 7 is a diagram illustrating the partition of a coding unit into one or more prediction units.

FIG. 7 is a diagram illustrating the partition of a CU 502 into one or more PUs 702. A PU 702 corresponds to a partitioned CU 502 and is used to predict pixels values for intra-picture or inter-picture types. PUs 702 are an extension of the partitioning of H.264/AVC for motion estimation, and are defined for each CU 502 that is not further subdivided into other CUs ("split flag"=0). At each leaf 604 of the quadtree 600, a final (bottom level) CU 502 of 2N×2N can possess one of four possible patterns of PUs: 2N×2N (702A), 2N×N (702B), N×2N (702C) and N×N (702D)), as shown in FIG. 7.

A CU 502 can be either spatially or temporally predictive coded. If a CU 502 is coded in "intra" mode, each PU 702 of the CU 502 can have its own spatial prediction direction and image information as further described below. Also, in the "intra" mode, the PU 702 of the CU 502 may depend on another CU 502 because it may use a spatial neighbor, which is in another CU. If a CU 502 is coded in "inter" mode, each PU 702 of the CU 502 can have its own motion vector(s) and associated reference picture(s) as further described below.

Figure 8:
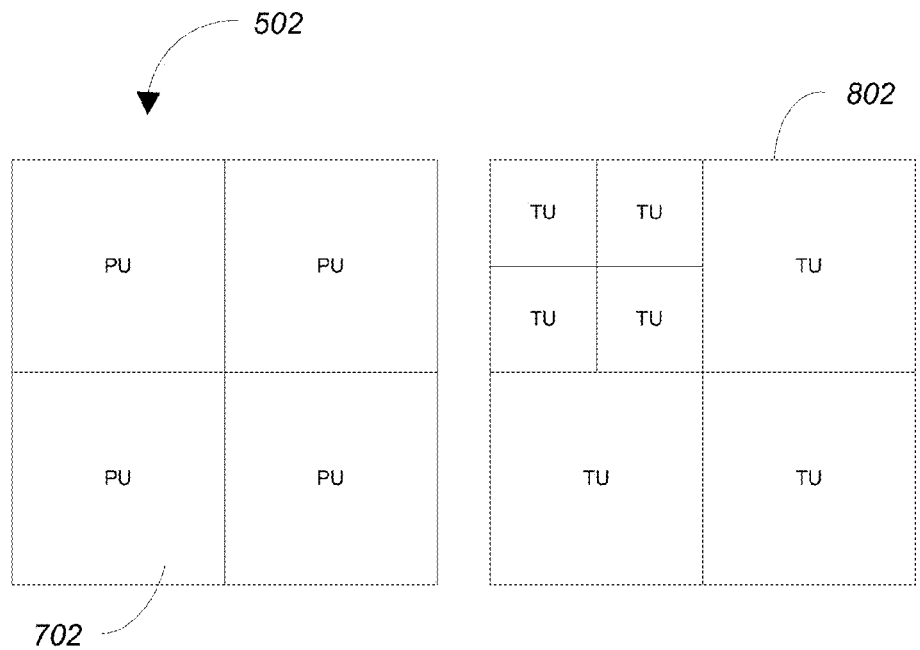
FIG. 8 is a diagram showing a coding unit partitioned into four prediction units and an associated set of transform units.

FIG. 8 is a diagram showing a CU 502 partitioned into four PUs 702 and an associated set of transform units (TUs) 802. TUs 802 are used to represent the elementary units that are spatially transformed by a DCT (Discrete Cosine Transform). The size and location of each block transform TU 802 within a CU 502 is described by a "residual" quadtree (RQT) further illustrated below.

Figure 9:
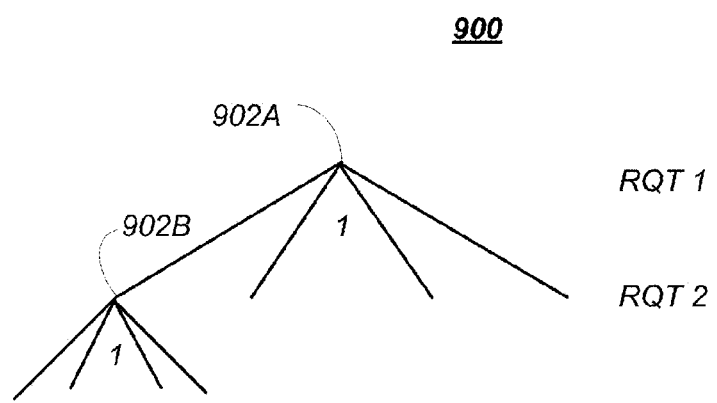
FIG. 9 is a diagram showing RQT codetree for the transform units associated with the coding unit in the example of FIG. 8.

FIG. 9 is a diagram showing RQT 900 for TUs 802 for the CU 502 in the example of FIG. 8. Note that the "1" at the first node 902A of the RQT 900 indicates that there are four branches and that the "1" at the second node 902B at the adjacent lower hierarchical level indicates that the indicated node further has four branches. The data describing the RQT 900 is also coded and transmitted as an overhead in the bitstream 314.

The coding parameters of a video sequence may be stored in dedicated NAL units called parameter sets. Two types of parameter sets NAL units may be employed. The first parameter set type is known as a Sequence Parameter Set (SPS), and comprises a NAL unit that includes parameters that are unchanged during the entire video sequence. Typically, an SPS handles the coding profile, the size of the video frames and other parameters. The second type of parameter set is known as a Picture Parameter Set (PPS), and codes different values that may change from one image to another.

Spatial and Temporal Prediction

One of the techniques used to compress a bitstream 314 is to forego the storage of pixel values themselves and instead, predict the pixel values using a process that can be repeated at the decoder 220 and store or transmit the difference between the predicted pixel values and the actual pixel values (known as the residual). So long as the decoder 220 can compute the same predicted pixel values from the information provided, the actual picture values can be recovered by adding the residuals to the predicted values. The same technique can be used to compress other data as well.

Referring back to FIG. 3, each PU 702 of the CU 502 being processed is provided to a predictor module 307. The predictor module 307 predicts the values of the PUs 702 based on information in nearby PUs 702 in the same frame (intra-frame prediction, which is performed by the spatial predictor 324) and information of PUs 702 in temporally proximate frames (inter-frame prediction, which is performed by the temporal predictor 330). Temporal prediction, however, may not always be based on a collocated PU, since collocated PUs are defined to be located at a reference/non-reference frame having the same x and y coordinates as the current PU 702. These techniques take advantage of spatial and temporal dependencies between PUs 702.

Encoded units can therefore be categorized to include two types: (1) non-temporally predicted units and (2) temporally predicted units. Non-temporally predicted units are predicted using the current frame, including adjacent or nearby PUs 702 within the frame (e.g. intra-frame prediction), and are generated by the spatial predictor 324. Temporally predicted units are predicted from one temporal picture (e.g. P-frames) or predicted from at least two reference pictures temporally ahead and/or behind (i.e. B-frames).

Spatial Prediction

Figure 10:
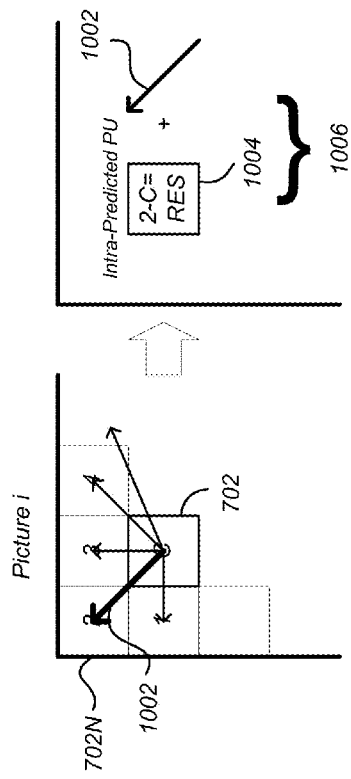
FIG. 10 is a diagram illustrating spatial prediction of prediction units.

FIG. 10 is a diagram illustrating spatial prediction of PUs 702. A picture i may comprise a PU 702 and spatially proximate other PUs 1-4, including nearby PU 702N. The spatial predictor 324 predicts the current block (e.g. block C of FIG. 10) by means of an "intra-frame" prediction which uses PUs 702 of already-encoded other blocks of pixels of the current image.

The spatial predictor 324 locates a nearby PU (e.g. PU 1, 2, 3 or 4 of FIG. 10) that is appropriate for spatial coding and determines an angular prediction direction to that nearby PU. In HEVC, 35 directions can be considered, so each PU may have one of 35 directions associated with it, including horizontal, vertical, 45 degree diagonal, 135 degree diagonal, DC etc. The spatial prediction direction of the PU is indicated in the syntax.

Referring back to the spatial predictor 324 of FIG. 3, this located nearby PU is used to compute a residual PU 704 (e) as the difference between the pixels of the nearby PU 702N and the current PU 702, using element 305. The result is an intra-predicted PU element 1006 that comprises a prediction direction 1002 and the intra-predicted residual PU 1004. The prediction direction 1002 may be coded by inferring the direction from spatially proximate PUs, and the spatial dependencies of the picture, enabling the coding rate of the intra prediction direction mode to be reduced.

Temporal Prediction

Figure 11:
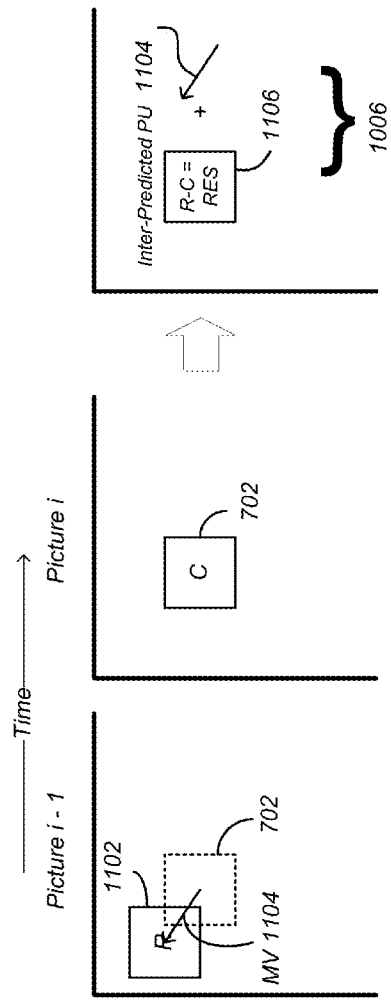
FIG. 11 is a diagram illustrating temporal prediction.

FIG. 11 is a diagram illustrating temporal prediction. Temporal prediction considers information from temporally neighboring pictures or frames, such as the previous picture, picture i-1.

Generally, temporal prediction includes single-prediction (P-type), which predicts the PU 702 by referring to one reference area from only one reference picture, and multiple prediction (B-type), which predicts the PU by referring to two reference areas from one or two reference pictures. Reference images are images in the video sequence that have already been coded and then reconstructed (by decoding).

The temporal predictor 330 identifies, in one or several of these reference areas (one for P-type or several for B-type), areas of pixels in a temporally nearby frame so that they can be used as predictors of this current PU 702. In the case where several areas predictors are used (B-type), they may be merged to generate one single prediction. The reference area 1102 is identified in the reference frame by a motion vector (MV)1104 that is defines the displacement between the current PU 702 in current frame (picture i) and the reference area 1102 (refIdx) in the reference frame (picture i-1). A PU in a B-picture may have up to two MVs. Both MV and refIdx information are included in the syntax of the HEVC Bitstream.

Referring again to FIG. 3, a difference between the pixel values between of the reference area 1102 and the current PU 702 may be computed by element 305 as selected by switch 306. This difference is referred to as the residual of the inter-predicted PU 1106. At the end of the temporal or inter-frame prediction process, the current PU 1006 is composed of one motion vector MV 1104 and a residual 1106.

However, as described above, one technique for compressing data is to generate predicted values for the data using means repeatable by the decoder 220, computing the difference between the predicted and actual values of the data (the residual) and transmitting the residual for decoding. So long as the decoder 220 can reproduce the predicted values, the residual values can be used to determine the actual values.

This technique can be applied to the MVs 1104 used in temporal prediction by generating a prediction of the MV 1104, computing a difference between the actual MV 1104 and the predicted MV 1104 (a residual) and transmitting the MV residual in the bitstream 314. So long as the decoder 220 can reproduce the predicted MV 1104, the actual MV 1104 can be computed from the residual. HEVC computes a predicted MV for each PU 702 using the spatial correlation of movement between nearby PUs 702.

Figure 12:
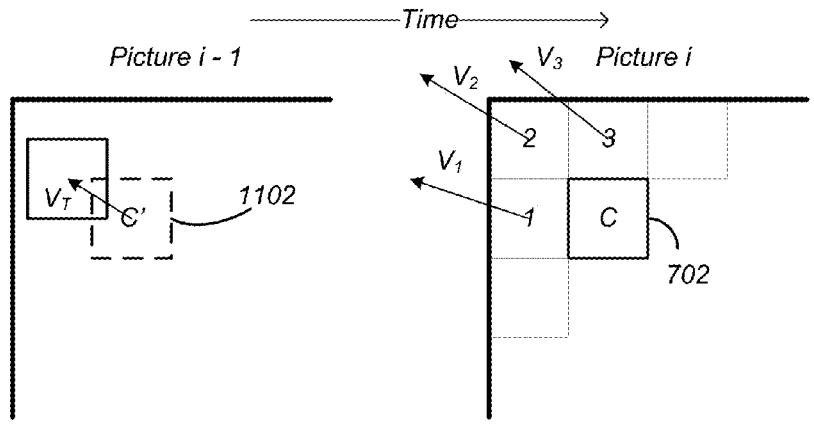
FIG. 12 is a diagram illustrating the use of motion vector predictors (MVPs)

FIG. 12 is a diagram illustrating the use of motion vector predictors (MVPs) in HEVC. Motion vector predictors V1, V2 and V3 are taken from the MVs 1104 of a plurality of blocks 1, 2, and 3 situated nearby or adjacent the block to encode (C). As these vectors refer to motion vectors of spatially neighboring blocks within the same temporal frame and can be used to predict the motion vector of the block to encode, these vectors are known as spatial motion predictors.

FIG. 12 also illustrates temporal motion vector predictor VT which is the motion vector of the co-located block C' in a previously decoded picture (in decoding order) of the sequence (e. g. block of picture i-1 located at the same spatial position as the block being coded (block C of image i).

The components of the spatial motion vector predictors V1, V2 and V3 and the temporal motion vector predictor VT can be used to generate a median motion vector predictor VM. In HEVC, the three spatial motion vector predictors may be taken as shown in FIG. 12, that is, from the block situated to the left of the block to encode (V1), the block situated above (V3) and from one of the blocks situated at the respective corners of the block to encode (V2), according to a predetermined rule of availability. This MV predictor selection technique is known as Advanced Motion Vector Prediction (AMVP).

A plurality of (typically five) MV predictor (MVP) candidates having spatial predictors (e.g. V1, V2 and V3) and temporal predictor(s) VT is therefore obtained. In order to reduce the overhead of signaling the motion vector predictor in the bitstream, the set of motion vector predictors may reduced by eliminating data for duplicated motion vectors (for example, MVs which have the same value as other MVs may be eliminated from the candidates).

The encoder 202 may select a "best" motion vector predictor from among the candidates, and compute a motion vector predictor residual as a difference between the selected motion vector predictor and the actual motion vector, and transmit the motion vector predictor residual in the bitstream 314. To perform this operation, the actual motion vector must be stored for later use by the decoder 220 (although it is not transmitted in the bit stream 314. Signaling bits or flags are included in the bitstream 314 to specify which MV residual was computed from the normalized motion vector predictor, and are later used by the decoder to recover the motion vector. These bits or flags are further described below.

Referring back to FIG. 3, the intra-predicted residuals 1004 and the inter-predicted residuals 1106 obtained from the spatial (intra) or temporal (inter) prediction process are then transformed by transform module 308 into the transform units (TUs) 802 described above. A TU 802 can be further split into smaller TUs using the RQT decomposition described above with respect to FIG. 9. In HEVC, generally 2 or 3 levels of decompositions are used and authorized transform sizes are from 32×32, 16×16, 8×8 and 4×4. As described above, the transform is derived according to a discrete cosine transform (DCT) or discrete sine transform (DST).

The residual transformed coefficients are then quantized by quantizer 310. Quantization plays a very important role in data compression. In HEVC, quantization converts the high precision transform coefficients into a finite number of possible values. Although the quantization permits a great deal of compression, quantization is a lossy operation, and the loss by quantization cannot be recovered.

The coefficients of the quantized transformed residual are then coded by means of an entropy coder 312 and then inserted into the compressed bit stream 310 as a part of the useful data coding the images of the AV information. Coding syntax elements may also be coded using spatial dependencies between syntax elements to increase the coding efficiency. HEVC offers context-adaptive binary arithmetic coding (CABAC). Other forms or entropy or arithmetic coding may also be used.

In order to calculate the predictors used above, the encoder 202 decodes already encoded PUs 702 using "decoding" loop 315, which includes elements 316, 318, 320, 322, 328. This decoding loop 315 reconstructs the PUs and images from the quantized transformed residuals.

The quantized transform residual coefficients E are provided to dequantizer 316, which applies the inverse operation to that of quantizer 310 to produce dequantized transform coefficients of the residual PU (E') 708. The dequantized data 708 is then provided to inverse transformer 318 which applies the inverse of the transform applied by the transform module 308 to generate reconstructed residual coefficients of the PU (e') 710.

The reconstructed coefficients of the residual PU 710 are then added to the corresponding coefficients of the corresponding predicted PU (x') 702' selected from the intra-predicted PU 1004 and the inter-predicted PU 1106 by selector 306. For example, if the reconstructed residual comes from the "intra" coding process of the spatial predictor 324, the "intra" predictor (x') is added to this residual in order to recover a reconstructed PU (x") 712 corresponding to the original PU 702 modified by the losses resulting from a transformation, for example in this case the quantization operations. If the residual 710 comes from an "inter" coding process of the temporal predictor 330, the areas pointed to by the current motion vectors (these areas belong to the reference images stored in reference buffer 328 referred by the current image indices) are merged then added to this decoded residual. In this way the original PU 702 is modified by the losses resulting from the quantization operations.

To the extent that the encoder 202 uses motion vector prediction techniques analogous to the image prediction techniques described above, the motion vector may be stored using motion vector buffer 329 for use in temporally subsequent frames. As further described below, a flag may be set and transferred in the syntax to indicate that the motion vector for the currently decoded frame should be used for at least the subsequently coded frame instead of replacing the contents of the MV buffer 329 with the MV for the current frame.

A loop filter 322 is applied to the reconstructed signal (x") 712 in order to reduce the effects created by heavy quantization of the residuals obtained, and to improve the signal quality. The loop filter 322 may comprise, for example, a deblocking filter for smoothing borders between PUs to visually attenuate high frequencies created by the coding process and a linear filter that is applied after all of the PUs for an image have been decoded to minimize the sum of the square difference (SSD) with the original image. The linear filtering process is performed on a frame by frame basis and uses several pixels around the pixel to be filtered, and also uses spatial dependencies between pixels of the frame. The linear filter coefficients may be coded and transmitted in one header of the bitstream typically a picture or slice header.

The filtered images, also known as reconstructed images, are then stored as reference images from reference image buffer 328 in order to allow the subsequent "Inter" predictions taking place during the compression of the subsequent images of the current video sequence.

Reference Image Syntax

As described above, to reduce errors and improve compression, HEVC permits the use of several reference images for the estimation and motion compensation of the current image. Given a current PU 702 in a current picture, the collocated PU 1102 resides in associated nearby reference/non-reference picture. For example, in FIG. 12, the collocated PU 1102 for current PU 702 in picture (i) resides in the associated nearby reference picture (i-1). The best "inter" or temporal predictors of the current PU 702 are selected in some of the multiple reference/non-reference images, which may be based on frames temporally prior to or after the current frame in display order (backwards and forward prediction, respectively).

For HEVC, the index to reference pictures is defined by reference picture lists that are included with the syntax. Forward prediction is defined by list 0 (RefPicList0), and backward prediction is defined by list 1 (RefPicList1), and both list 0 and list 1 can contain multiple reference pictures prior to or/and later than the current picture in the display order.

Figure 13:
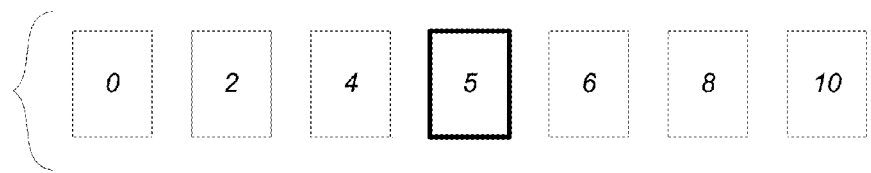
FIG. 13 illustrates an example of the use of the reference picture lists.

FIG. 13 illustrates an example of the use of the reference picture lists. Consider pictures 0, 2, 4, 5, 6, 8 and 10 shown in FIG. 13, wherein the numbers of each picture denote display order and the current picture is picture 5. In this case, the list 0 reference pictures with ascending reference picture indices and starting with index equal to zero are 4, 2, 0, 6, 8 and 10, and the list 1 reference pictures with ascending reference picture indices and starting with index equal to zero are 6, 8, 10, 4, 2, and 0. A slice that the motion compensated prediction is restricted to the list 0 prediction is called a P-slice. Collocated pictures are indicated by using the collocated_ref_idx index in the HEVC. For a B-slice, the motion compensated prediction also includes the list 1 prediction in addition to the list 0 prediction.

Hence, the collocated PU 1102 is disposed in a reference picture specified in either list 0 or list 1. A flag (collocated_from_l0_flag) is currently used to specify whether the collocated partition should be derived from list 0 or list 1 for a particular slice type. Each of the reference pictures is also associated with a motion vector.

The storage and retrieval of reference pictures and related motion vectors for the emerging HEVC standard is expressed in paragraph 8.4.1.2.9 of Benjamin Bross, Woo-Jin Han, Jens-Rainer Ohm, Gary J. Sullivan, Thomas Wiegand, "WD4: Working Draft 4 of High-Efficiency Video Coding," Joint Collaborative Team on Video Coding (JCT-VC) of ITU-T SG16 WP3 and ISO/IEC JTC1/SC29/WG11, JCTVC-F803_d5, 6th Meeting: Torino, IT, 14-22 Jul., 2011 (hereby incorporated by reference herein).

According to the standard, if the slice_type is equal to B and the collocated_from_10_flag is 0, the collocated_ref_idx variable specifies the reference picture as the picture that contains the co-located partition as specified by RefPicList1. Otherwise (slice_type is equal to B and collocated_from_10_flag is equal to 1 or slice_type is equal to P), the collocated_ref_idx variable specifies the reference picture as the picture that contains the collocated partition as specified by RefPicList0.

Figure 14:
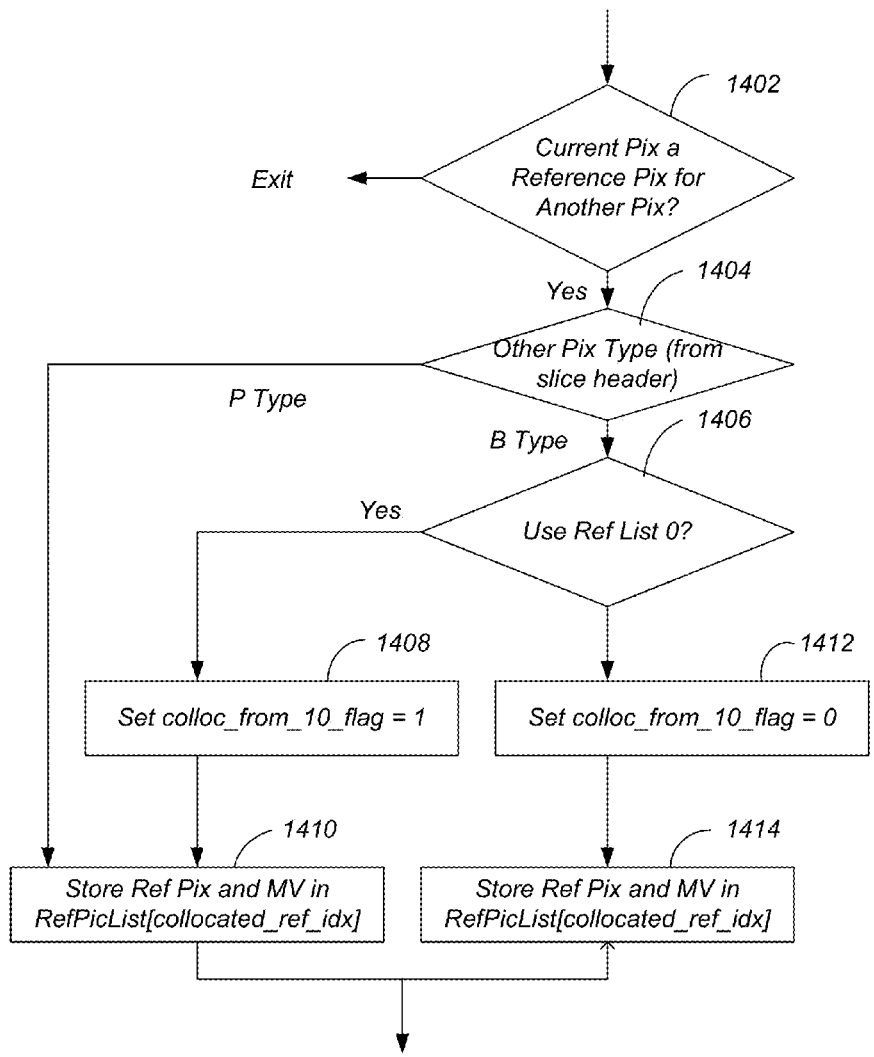
FIG. 14 is a diagram illustrating processes performed by the encoder according to the aforementioned standard.

FIG. 14 is a diagram illustrating processes performed by the encoder 202 according to the aforementioned standard. Block 1402 determines whether the current picture is a reference picture for another picture. If not, there is no need to store reference picture or motion vector information. If the current picture is a reference picture for another picture, block 1504 determines whether the "another" picture is a P-type or a B-type picture. If the picture is a P-type picture, processing is passed to blocks 1410, which set the colloc_from_10_flag to one and store the reference picture and motion vector in list 0. If the "another picture" is a B-type picture, block 1406 nonetheless directs processing to blocks 1408 and 1410 if the desired reference picture is to be stored in list 0, and to blocks 1412 and 1414 if the desired reference picture and motion vector is to be stored in list 1. This decision may be based on whether it is desirable to select reference pictures from a temporally preceding or succeeding picture. Which of the multiple possible reference pictures is selected is determined according to the collocated_ref_idx index.

Figure 15:
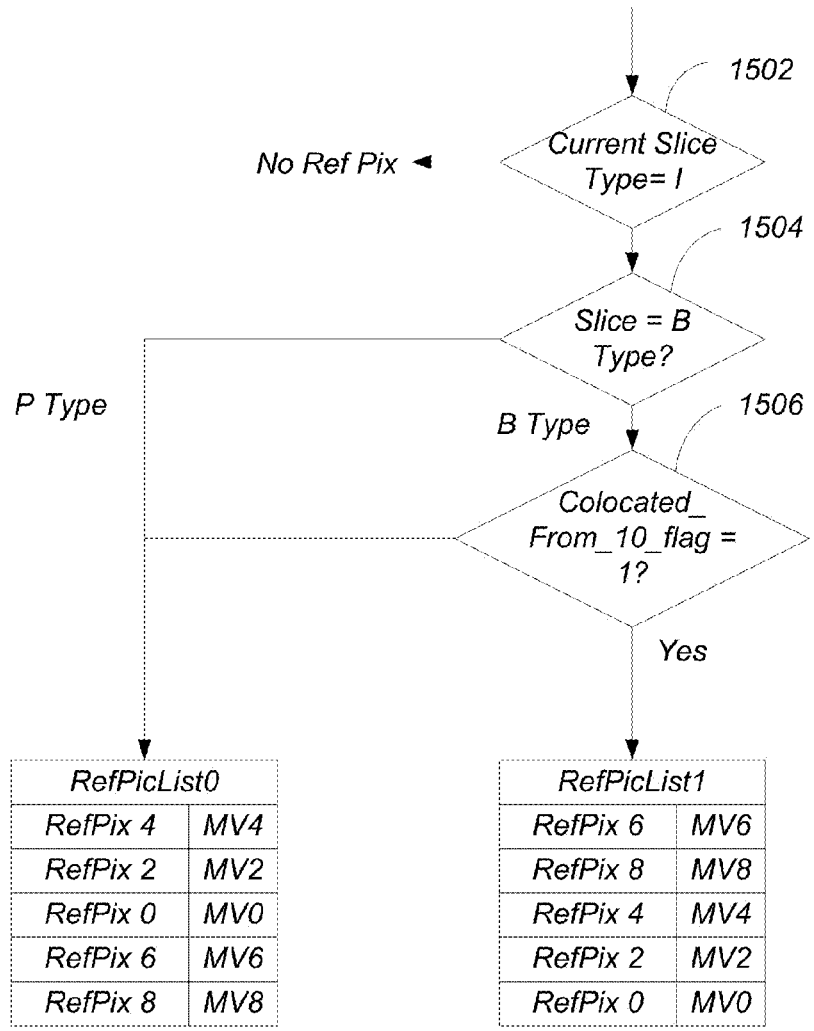
FIG. 15 depicts the use of a the collocated_from_10_flag by the decoder in decoding a according to the emerging HEVC standard.

FIG. 15 depicts the use of a the collocated_from_10_flag by the decoder 220 in decoding a according to the emerging HEVC standard. Referring to FIG. 15, block 1502 determines if the current slice type being computed is an intra or I-type. Such slices do not use temporally nearby slices in the endoding/decoding process, and hence there is no need to find a temporally nearby reference picture. If the slice type is not I-type, block 1504 determines whether the slice is a B-slice. If the slice is not a B-type, it is a P-type slice, and the reference picture that contains the collocated partition is found in list 0, according to the value of collocated_ref_idx. If the slice is B-type, the collocated_from_10_flag determines whether the reference picture is found in list 0 or list 1. As the index indicates, the collocated picture is therefore defined as the reference picture having the indicated collocated_ref_idx in either list 0 or list 1, depending on the slice type (B-type or P-type)and the value of the collocated_from_10_flag. In one embodiment of HEVC, the first reference picture (the reference picture having index [0] as shown in FIG. 13 is selected as the collocated picture).

Slice-by-Slice Efficient Storage of Motion Information

The problem arises that if the coded current picture may be used as a reference picture for another picture, the motion vector 1104 for the current picture must be stored for later use. That is because the current picture can be the collocated picture for other pictures and its PUs may be the collocated PUs for the PUs in those pictures. For example, the VT and the other MVs for units in Picture i-1 shown in FIG. 12 must be stored because those VTs and other MVs may be used by other units such as PU 702. Since there are generally N reference pictures, the MVs for all N reference pictures must be stored, which can be costly.

Techniques for the reduction in memory required for reference pictures has been proposed in Edouard FRANCOIS, Christophe GISQUET, Guillaume LAROCHE, Patrice ONNO, and Naël OUEDRAOGO, "On memory compression for motion vector prediction", Joint Collaborative Team on Video Coding (JCT-VC) of ITU-T SG16 WP3 and ISO/IEC JTC1/SC29/WG11, JCTVC-E221, 5th Meeting: Geneva, March, 2011, which is hereby incorporated by reference herein.

However, such techniques still store all of the MVs of each candidate reference pictures, even when the MV for the candidate reference picture are not likely to be used. Further, even if only the MV for the zero index reference picture were used, further reductions in the memory required to store the MVs of the collocated reference pictures are possible In such cases, further reductions in the memory required to store the MVs of collocated pictures are possible if the MVs of the currently decoded picture are only stored if required. Otherwise, the stored previous picture's motion vector can be utilized in the decoding process for the current picture. An index or flag can be used to indicate if the normalized MVs of the current picture will replace the stored MVs of the previous reference picture.

The index or flag can be included in the syntax of the bitstream, and may be presented in the slice or picture header. In one embodiment, the slice header syntax is modified to include an index (update_collocated_picture_idx) to indicate whether the MVs of the current picture should replace those from the picture used to generate the current picture. For example, the syntax may be defined such that normalized MVs of the current picture will be stored, thus replacing the MVs of the picture previously encoded, if the index (update_collocated_picture_idx) of the current picture is 1. Otherwise, the MVs for the previous picture may be retained unchanged and be used for the generation of subsequent pictures.

Figure 16:
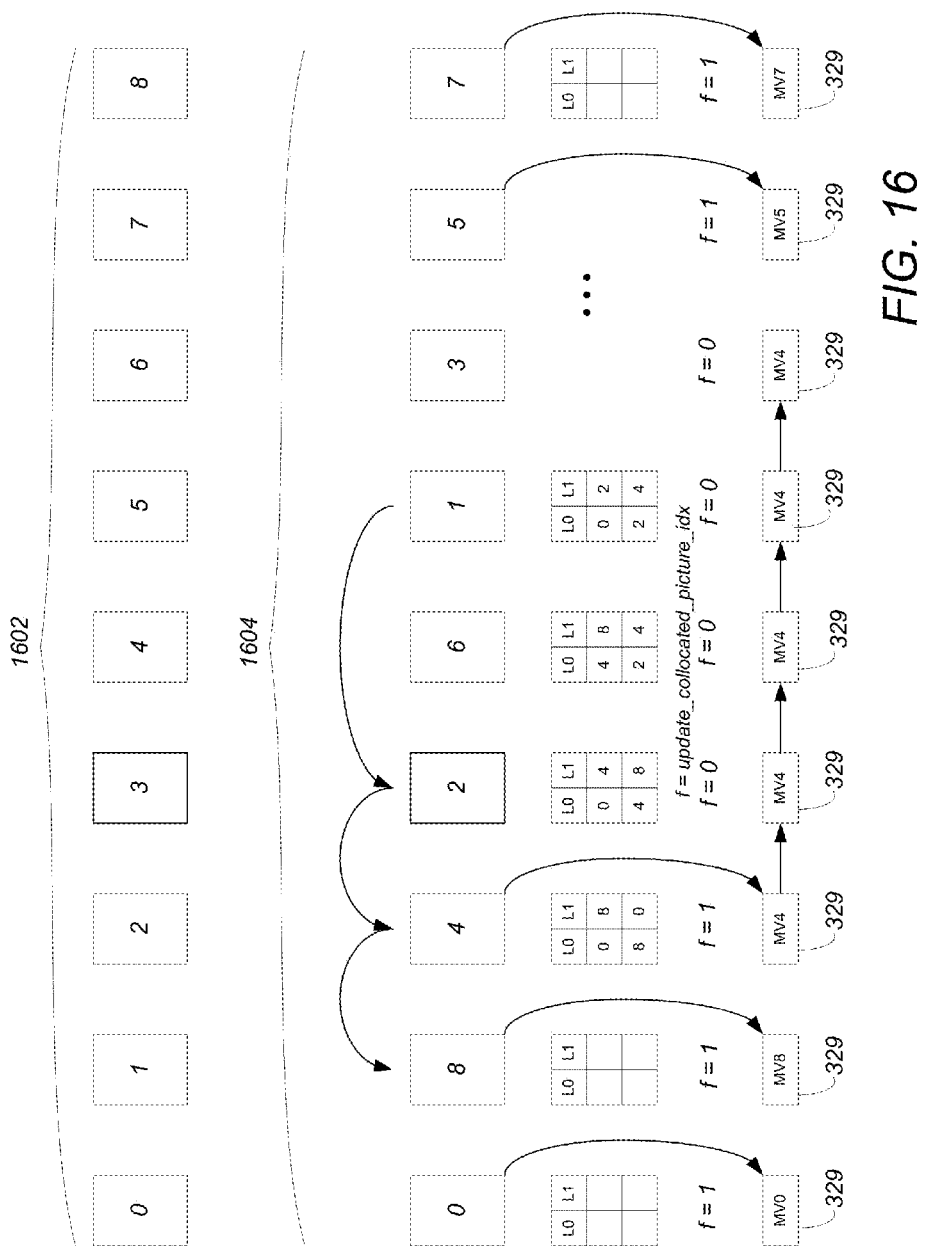
FIG. 16 is a diagram illustrating how motion vector information may be efficiently stored and used.

FIG. 16 is a diagram illustrating how motion vector information may be efficiently stored and used. Consider picture group 1602 having pictures 0-8, which represent a plurality of pictures in the order that they are presented to the viewer when reproduced. As described above, the coding of the plurality of pictures is such that some of the pictures are coded using information in pictures that temporally follow the picture in presentation order. For example, picture 2 may be encoded using information in picture 4.

Consider picture group 1604, which includes the same pictures 0-8, but in the order they are processed and encoded by the encoder 202 instead of the order they are presented to the user for display. In this illustrated example, the order of processing is 0, 8, 4, 2, 6, 1, 3, 5 and 7. Further consider that pictures 0 and 8 (the frames that bookend the sequence of pictures 1604 are intra-coded and do not use information from any other picture.

Picture 0 is encoded, resulting in a motion vector MV0 that is stored in the motion vector buffer 329. Since the picture 0 is intra-encoded picture, the encoder 202 knows that its computed motion vector (and not that of a previously computed picture) should be used in the computation of the next picture to be encoded, so the encoder 202 sets the update_collocated_picture_idx flag to one, thus indicating that the next picture to be encoded (picture 8) should substitute the motion vector computed for that picture for the motion vector (MVO) that is currently stored in the motion vector buffer 329.

Next, picture 8 is encoded, using the motion vector MV0 stored in the motion vector buffer 329 and a new motion vector MV8 is computed. Since the update_collocated_picture_idx flag is set to 1, the encoder 202 replaces the motion vector information currently stored in the motion vector buffer 329 with the motion vector computed in connection with picture 8, MV8.

Next, picture 4 is encoded, using motion vector MV8 from the previously encoded frame, thus generating an associated motion vector for picture 4, MV4. Encoder 329 then determines whether the motion vector information currently stored in the motion vector buffer 329 (MV8) should be retained in the buffer 329 for use in computing the next picture to be encoded (picture 2, or whether it should be replaced by the more recently computed motion vector (MV4). Since picture 2 is temporally closer to picture 4 than it is picture 8, the motion vector for picture 4 would presumably result in a better encoded picture, so the encoder 202 sets the update_collocated_picture_idx flag to 1, indicating that the motion vector computed for picture 4 (MV4) should replace the current motion vector stored in the motion vector buffer 329 (MV8).

Picture 2 is the next picture to be encoded. Picture 2 is encoded using the motion vector stored in the motion vector buffer 329 (MV8), and the encoding results in a new motion vector (MV2). The question now arises as to whether the motion vector of the currently coded picture (MV2) should replace the motion vector currently stored in the motion vector buffer 329 (MV4). The encoder 202 determines that the next picture to be encoded is picture 6, which is temporally closer to picture 4 than picture 2. Hence, it is reasonable to expect that the encoding of picture 6 would yield a better result if the MV used in the process was associated with a picture temporally closer to picture 6. In the instant case, the choices are picture 4 and picture 2, and since picture 4 is temporally closer to picture 4 than picture 2, MV4 is expected to be a better choice for the encoding of picture 6 than MV2. Accordingly, the encoder 202 sets the update_collocated_picture_idx flag to a zero, thus indicating that the motion vector computed for the current frame (MV2) should not replace the motion vector currently stored in the motion vector buffer 329 (MV4)

The next picture to be encoded is picture 6. Picture 6 is encoded using the motion vector stored in the motion vector buffer (MV4). The result is the encoded picture residuals and the motion vector associated with picture 6 (MV6). The question now arises as to whether the next picture to be encoded (picture 1) is best encoded using the motion vector currently stored in the motion vector buffer 329 (MV4) or the motion vector computed for the current picture (MV2). Since picture 4 is temporally closer to picture 6 than is picture 2, the encoder 202 sets the update_collocated_picture_idx flag to a zero, and retains the motion vector currently stored in the motion vector buffer 329 (MV4) for use in the encoding of the next picture to be encoded, picture 1.

The next picture to be encoded is picture 1. Picture 1 is encoded using the motion vector stored in the motion vector buffer 329 (MV4), resulting in encoded picture 1 and MV1. The encoder 202 then determines whether the next frame to be encoded (frame 3) is best encoded with the motion vector currently stored in the motion vector buffer 329 (MV4) or the motion vector for the currently encoded picture (MV1). Since picture 3 is temporally closer to picture 4 than the currently encoded picture (picture 1), the encoder 202 sets the update_collocated_picture_idx flag to zero, thus retaining MV4 in the motion vector buffer 329, instead of storing MV 1 in the buffer 329.

The next picture to be encoded is picture 3. Picture 3 is encoded using the motion vector stored in the motion vector buffer 329 (MV4), and results in motion vector MV3. The encoder 329 determines whether the next picture to be encoded (picture 5) is better encoded using the motion vector currently stored in the motion vector buffer 329 (MV4). Since picture 5 is closer to picture 4 than picture 3, the encoder 329 elects to retain the motion vector currently stored in the motion vector buffer 329 (MV4) rather than to store the currently encoded frame's motion vector (MV5) in the motion vector buffer 329.

The next picture to be encoded is picture 5. Picture 5 is encoded using the motion vector stored in the motion vector buffer 329 (MV4), and results in motion vector MV5. The encoder 329 determines whether the next picture to be encoded (picture 7) is better encoded using the motion vector currently stored in the motion vector buffer 329 (MV4) or the motion vector of the currently encoded motion vector (MV5). Since picture 7 is temporally closer to picture 5, the encoder 329 elects to replace the motion vector currently stored in the buffer 329 (MV4) with the motion vector computed of the currently encoded picture (MV5) and sets the update_collocated_picture_idx flag to one, and replaces the motion vector stored in the motion vector buffer 329 (MV4) with the motion vector of the currently coded picture (MV5).

The encoder 329 then encodes picture 7 using the motion vector currently stored in the motion vector buffer 329 (MV5). Because the temporal distance between the next picture to be encoded and picture 7 will likely be less than the temporal distance between that picture and picture 4, the update_collocated_picture_idx flag is set to a 1.

This process is repeated for the next sequence of pictures.

FIG. 16 also illustrates the use of the reference picture list _0 (depicted as lo in FIG. 16) and reference picture list_1 (depicted as 11 in FIG. 16). Note that the reference picture lists associated with picture 4 indicate that the reference pictures are picture 0 and picture 8 for list _0 and picture 8 and picture 0). Since picture 4 is computed using information from picture 8 (which is temporally after picture 4), picture 4 is a B-type picture and the list_0 includes an 8 (indicating that the reference picture is picture 8) as the first entry. Similarly, picture 2 is computed from picture 4, making picture 2 also a B-type picture, and the first entry in list_1 is a 4. Also, picture 6 is computed from picture 4, which temporally precedes picture 6, so picture 6 is a P-type picture, and list _0 includes a 4 for the first entry, indicating that picture 4 is the reference picture for picture 6.

Figure 17A:
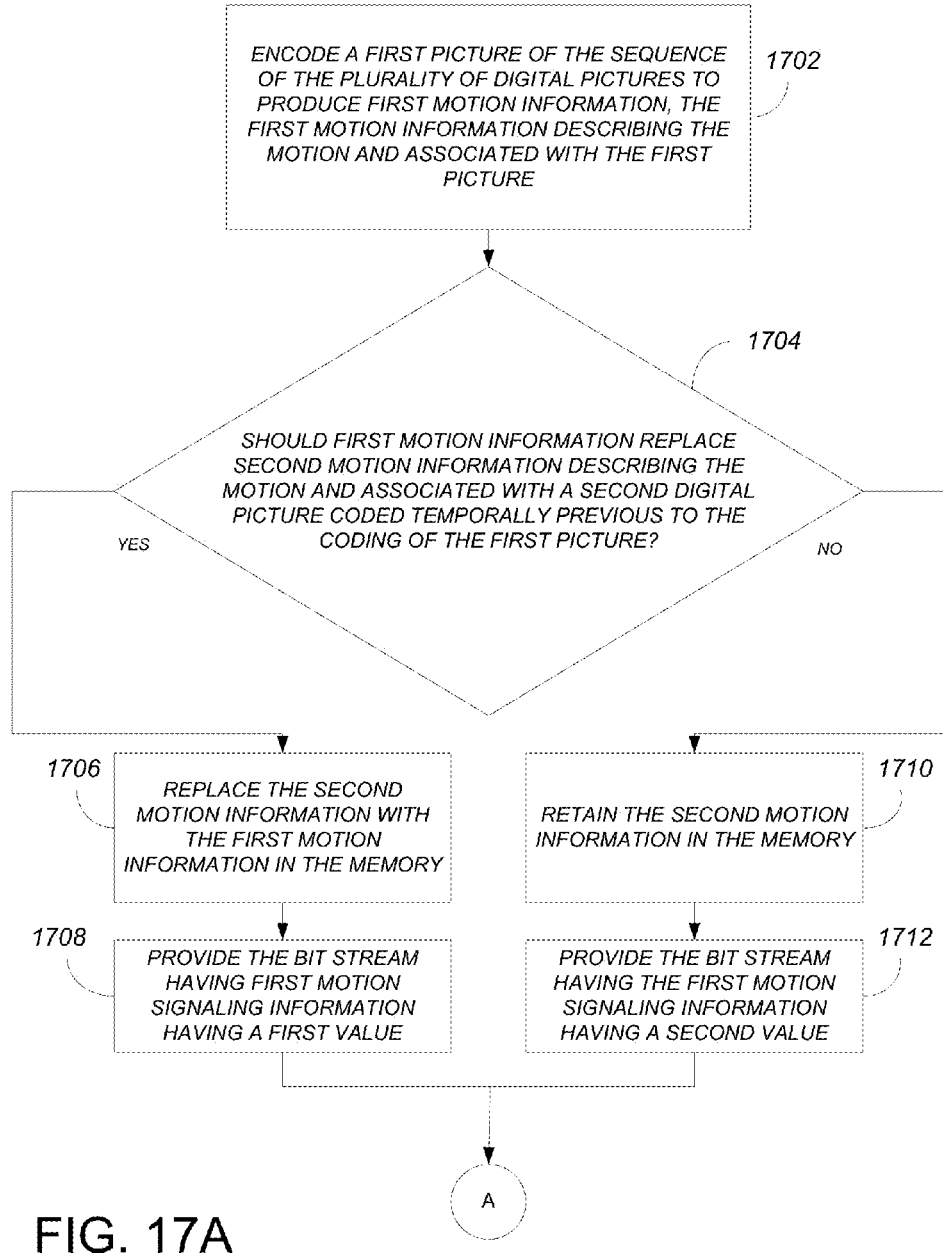
FIGS. 17A and 17B are diagrams presenting an illustration of a generalized process for performing the operations described in FIG. 16.
Figure 17B:
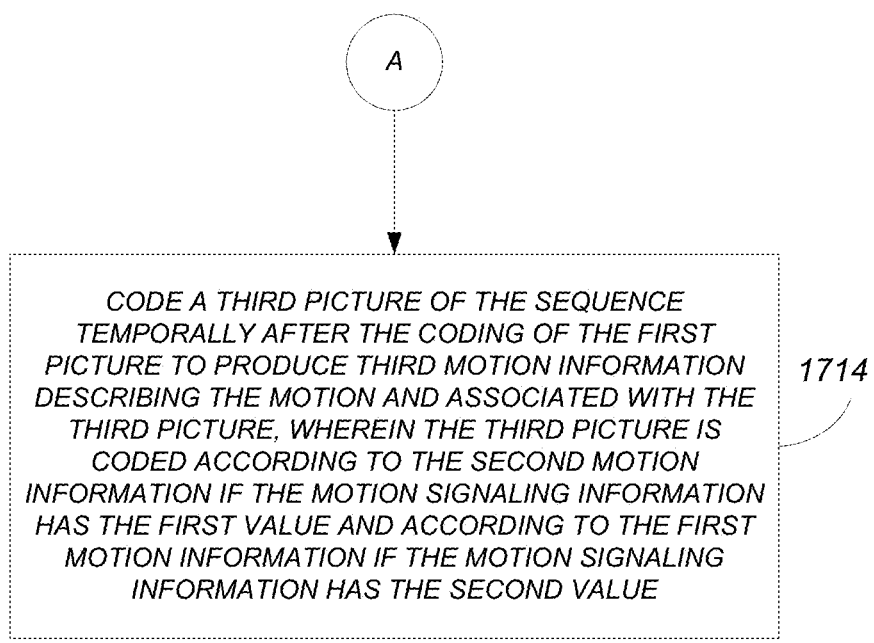

FIGS. 17A and 17B are diagrams presenting an illustration of a generalized process for performing the operations described in FIG. 16. In block 1702, a first picture of the sequence of the plurality of digital pictures is coded. The result of the encoding process may include the residuals described above and first motion information associated with the first picture that describes motion of images as depicted in the sequence of the plurality of frames. The first motion information may include, for example a motion vector.

Block 1704 determines whether the first motion information should replace second motion information associated with a second picture that was coded temporally previous to the coding of the first picture in the motion vector buffer 329 for use in coding the next picture. This can be determined as described further with respect to FIG. 18, as discussed further below.

If the first motion information should replace the second motion information, the second motion information already stored in the motion vector buffer 329 is replaced with the first motion information, as shown in block 1706. Further, first motion signaling information having a first value is provided in the bit stream, as shown in block 1708. The first motion information can be a flag or an index or other value. In one embodiment, the first motion signaling information is the update_collocated_picture_idx flag described above, and if the first motion information should replace the second motion information in the motion vector buffer 329, the updae_collocated_picture_idx flag is set to one.

If the first motion information should not replace the second motion information already stored in the motion vector buffer 329, the second motion information is retained, as shown in block 1710. Further, first motion signaling information having a second value is provided in the bit stream, as shown in block 1708. In the above example, the first motion signaling information comprises the update_collocated_picture_idx flag described above, and if the first motion information should not replace the second motion information in the motion vector buffer 329, the update_collocated_picture_idx flag is set to zero.

FIG. 17B is a diagram further presenting an illustration of the process for performing the operations described in FIG. 16. As shown in block 1714, a third picture is coded immediately after the coding of the first picture to produce third motion information associated with the third picture describing the motion. The third picture is coded according to the second motion information if the motion signaling information has the first value, and coded according to the first motion information if the first motion information has the second value.

Figure 18:
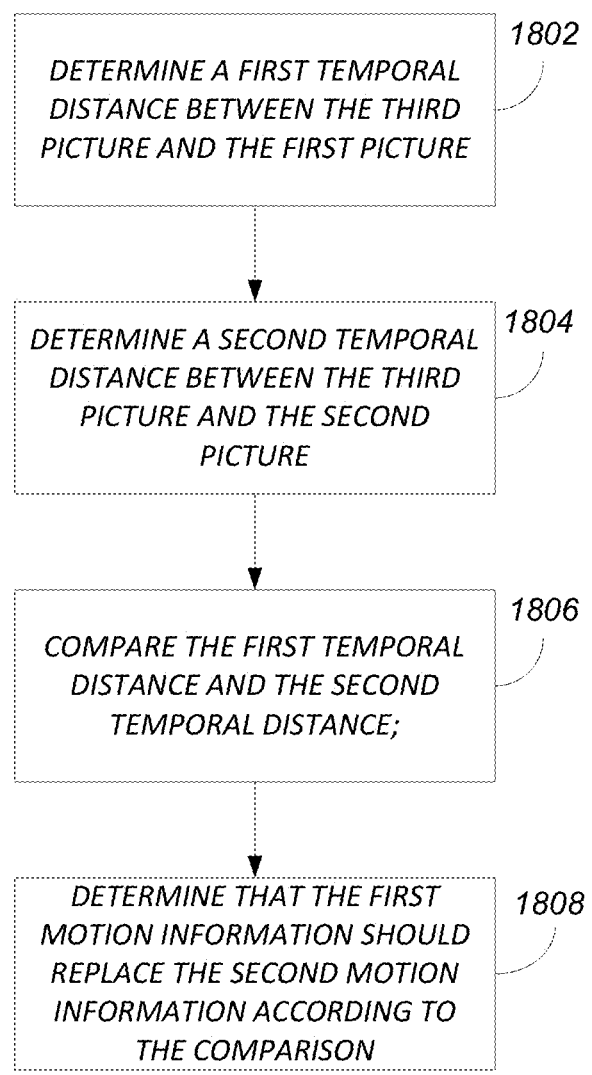
FIG. 18 is a diagram illustrating exemplary method steps for determining whether the first motion information associated with the first picture should replace the second motion information.

FIG. 18 is a diagram illustrating exemplary method steps for determining whether the first motion information associated with the first picture should replace the second motion information. Block 1802 determines a first temporal distance between the third picture and the first picture. Block 1804 determines the second temporal distance between the third picture and the second picture. Block 1806 compares the first temporal distance and the second temporal distance, and block 1807 determines whether the first motion information should replace the second motion information according to the comparison of block 1806. In one embodiment, the first motion information should replace the second motion information if comparison shows that the first temporal distance between the third picture and the second picture is greater than a second temporal distance between the third picture and the first picture.

Returning to the example of FIG. 16 and applying the logic shown in FIGS. 17A and 17B, consider the case wherein the first picture is picture 2. Block 1702 codes picture 2, producing MV2. Decision block 1704 determines whether MV2 should replace MV4, which is already stored in the motion vector buffer 329. Blocks 1802-1808 determine the temporal distance between the third picture (following the first picture in the coding sequence, picture 6) and the second picture (picture 4) is not greater than the temporal distance between the third picture (picture 6) and the first picture (picture 2). Hence, the first motion information (MV2) should not replace the second motion information (MV4), and the motion vector buffer 329 retains MV2. Finally, block 1714 codes the third picture (picture 6) using the motion vector stored in the motion vector buffer 329 (MV4).

The update_collocated_picture_idx flag can be sent as overhead in the encoded bit stream, for example as a parameter in the slice header.

SPS-Level Efficient Storage of Motion Information

The foregoing technique allows the efficient storage of motion information on a slice-by-slice or picture-by-picture basis. Additional savings may be realized by the use of a flag or similar artifice to control whether motion vectors for the previously computed picture are to be replaced with the motion vectors for the currently computed picture for all the pictures in a sequence defined by the SPS or sequence parameter set. Therefore, in order to further reduce the introducing index, a update_collocated_picture_idx_SPS flag can be used to control whether the motion vector previously stored in the motion vector buffer 329 is replaced with the motion vector for the current picture at SPS level to control all pictures referenced by the SPS.

If update_collocated_picture_idx_SPS is 1, all the coded pictures except intra-coded pictures, will have their motion vector replace the motion vector previously stored in the motion vector buffer 329. Otherwise, if update_collocated_picture_idx_SPS is 0, the update_collocated_picture_idx described above will determine if the currently coded picture will have its motion vector replace the previously stored motion vectors at the slice or PPS level. In addition, since the motion vector buffer 329 only keeps the motion vector for one picture, both the collocated_from_l0_flag and collocated_ref_idx flags at the slice header can be removed.

Thus, only the normalized motion vector of one picture are stored. If update_collocated_picture_idx_SPS is 1 or update_collocated_picture_idx_SPS is 0 and update_collocated_picture_idx is 1, the previously stored motion vector will be replaced by normalized motion vector of the current picture. Otherwise, if update_collocated_picture_idx_SPS is 0 and update_collocated_picture_idx is 0, the motion vectors previously stored in the motion vector buffer 329 will be retained unchanged.

Figure 19:
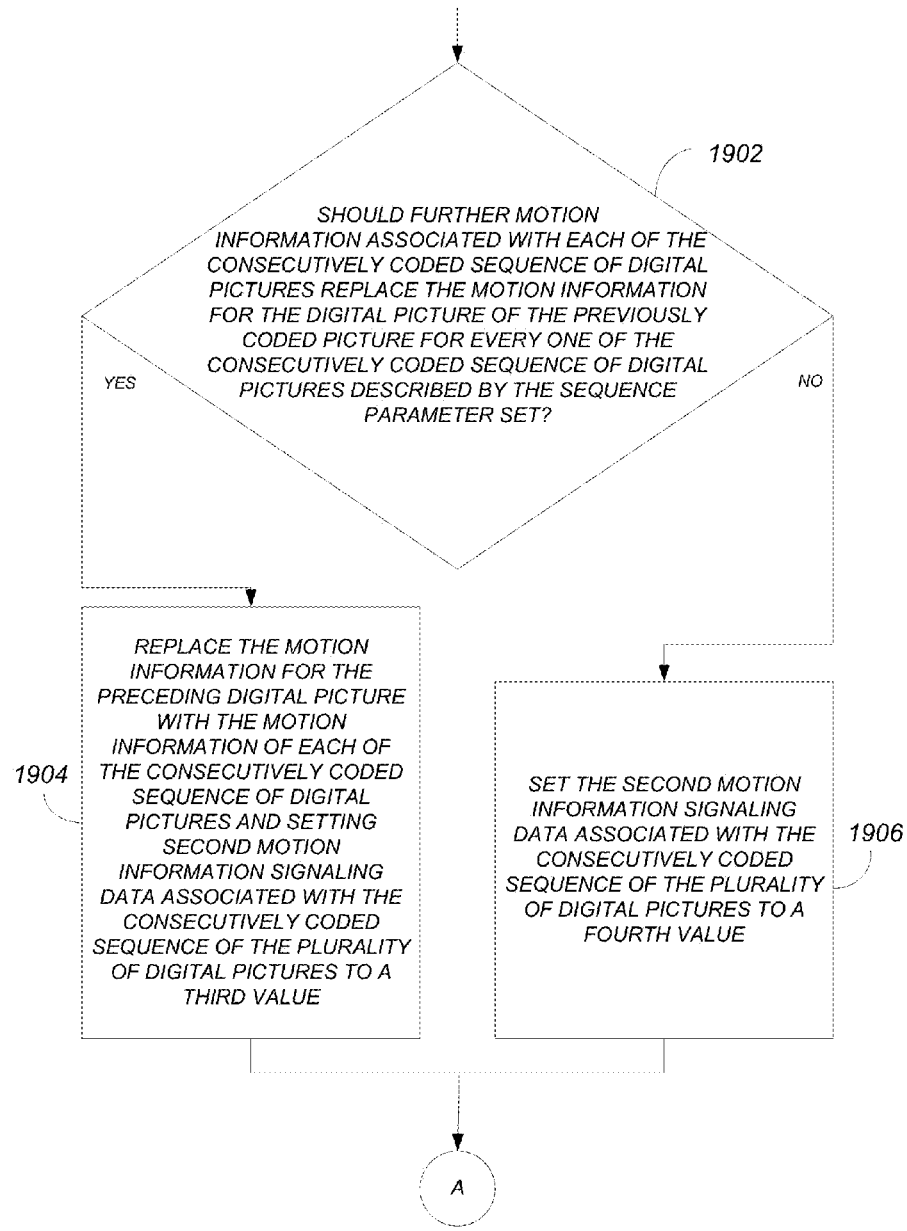
FIG. 19 is a diagram showing exemplary processing steps that can be used to implement SPS-level efficient storage of motion information.

FIG. 19 is a diagram showing exemplary processing steps that can be used to implement SPS-level efficient storage of motion information. Block 1902 determines whether it is desirable for further motion information associated with each of the consecutively coded sequence of digital pictures to replace the motion information for the digital picture of the previously coded picture for every one of the consecutively coded sequence of digital pictures described by the sequence parameter set. For example, considering the sequence shown in FIG. 16, it may be desirable to have every motion vector computed for each of the pictures to replace the motion vector stored in the motion vector memory 329 from the previous picture in the entire sequence. Functionally, this can be implemented by simply doing so and setting the update_collocated_picture_idx for each of the pictures equal to 1, but the same result can be obtained with less signaling data if a sequence level flag is used. As described above, that sequence-level flag is the update_collocated_picture_SPS_idx flag.

Returning to FIG. 19, if it is desirable for further motion information associated with each of the consecutively coded sequence of digital pictures to replace the motion information for the digital picture of the previously coded picture for every one of the consecutively coded sequence of digital pictures described by the sequence parameter set, processing is passed to block 1904, and the motion information for the preceding digital picture is replaced with the motion information of each of the consecutively coded sequence of digital pictures, and second motion information signaling data associated with the consecutively coded sequence of the plurality of digital pictures is set to a third value. In one embodiment, the second motion information signaling data comprises the update_collocated_picture_idx_SPS flag, and the third value is 1. Otherwise, the second motion information signaling data associated with the consecutively coded sequence of the plurality of digital pictures to a fourth value. For example, the update_collocated_picture_idx_SPS flag may be set to a 0 in this instance. Whether the motion information of the coded frames replaces the motion information in the memory computed from the previously computed frame or not, is left up to the update_collocated_picture_idx flag.

Decoding Bit Streams Using Efficiently Coded Motion Information

The operations performed in decoding the encoded bit stream 314 are analogous to those of the decoding loop 315 shown in FIG. 3. After the bit stream 314 is entropy decoded, it is dequantized and inverse transformed (in processes inversely analogous to block 312 and analogous to blocks 316 and 318 to recover the residual 710. The residual 710 is summed with the estimate x' from the predictor module 307 (either spatial 324 or temporal 330) to arrive at the recovered PU, in a process that is repeated as necessary for each residual PU and residual motion vector in the bit stream 314 to recover the picture and motion vector. As was the case with the encoder 202, the decoder stores the motion vector in a motion vector buffer analogous to motion vector 329 for use with other pictures in a reference picture buffer analogous to reference picture buffer 328. Accordingly, the decoder 220 must also store the motion information of the previously decoded picture as a part of decoding process. As described above, the encoder determines whether the motion vector of the currently coded frame should replace the motion vector currently stored in the buffer or not, and indicates whether the motion vector of the currently coded frame replaced the motion vector currently stored in the buffer using an update_collocated_picture_idx flag. The encoder 220 uses that flag to control whether or not the motion vector of the currently decoded frame replaces the motion vector currently stored in the buffer, thus replicating the process performed by the encoder 202 in a predictable way.

Figure 20:
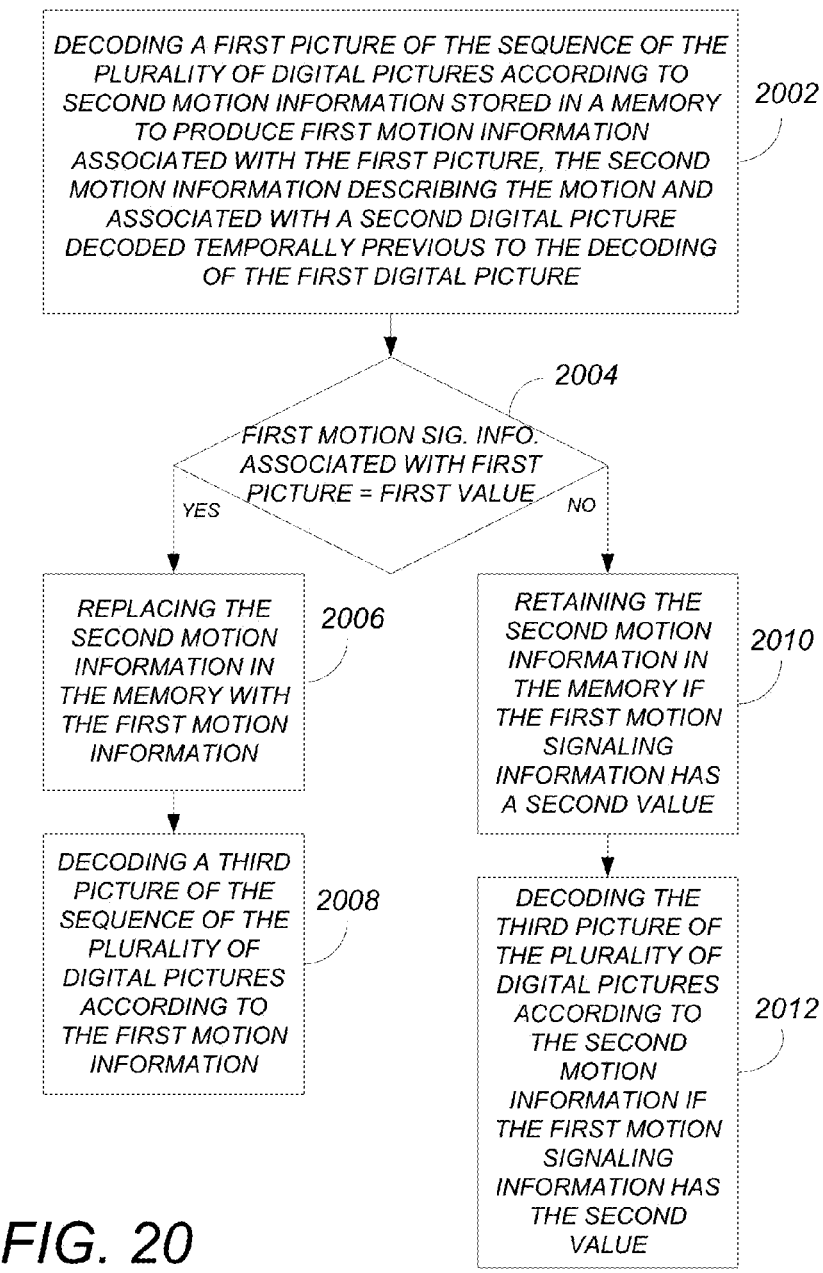
FIG. 20 is a diagram illustrating exemplary operations that can be used to decode a bit stream encoded as described above.

FIG. 20 is a diagram illustrating exemplary operations that can be used to decode a bit stream encoded as described above. Block 2002 decodes a first picture of the sequence of the plurality of digital pictures according to second motion information stored in a memory to produce first motion information associated with the first picture wherein the second motion information describes motion depicted in a sequence of pictures and the second motion information is associated with a second digital picture decoded temporally previous to the decoding of the first digital picture. Block 2004 determines if the first motion signaling information has a first value or a second value. If the first motion signaling information has a first value, processing is passed to block 2006, which replaces the second motion information in the memory with the first motion information. If the first motion signaling information has a second value, processing is passed to block 2010, which retains the second motion information in the memory. Blocks 2008 and 2012 decode the next frame to be decoded, using the motion vector information stored in the buffer as determined by the value of the first motion signaling information.

Referring back to the example of FIG. 16 consider the decoding of picture 2. Block 2002 decodes picture 2 using second motion information stored in the motion vector buffer 329 (MV4), and after the decoding picture is complete, examines the update_collocated_picture_idx flag. Consistent with decision block 2004 and block 2010 and 2012, since the update_collocated_picture_idx flag associated with picture 2 has a 0 value, the decoder 220 does not replace the current value of the motion vector buffer 329 with the recently computed motion vector of the current picture (MV2), and the next picture to be decoded (picture 6) is decoded using MV4.

The decoder 220 also responds to the update_collocated_picture_idx_SPS flag. If the update_collocated_picture_idx_SPS flag is set to a 1, the decoder 220 does not look to the update_collocated_picture_idx flag to determine whether to replace the current motion vector buffer 329 value with the motion vector of the each current picture. Instead, the encoder 220, upon reading the update_collocated_picture_idx_SPS flag in the bit stream, simply performs this operation for all pictures in the sequence associated with the SPS if the update_collocated_picture_idx_SPS flag equals 1. Conversely, if the update_collocated_picture_idx_SPS flag equals 0, the decoder 220 updates the value of the motion vector buffer according to the update_collocated_picture_idx flag.

It is noteworthy that since the efficiently coded motion vector techniques described above may store only one collocated picture, the collocated_ref_idx flag and the collocated_from_lo_flag in the baseline HEVC are no longer necessary, regardless of the value of update_collocated_picture_idx and update_collocated_pix_idx_SPS. Further, the single collocated picture can be either a traditional reference picture or a non-reference picture. In the currently defined HEVC, the collocated picture must be a reference picture (as they reference/non-reference pictures are defined from a motion compensation point of view). For example, in the sequence illustrated in FIG. 16, pictures 8, 4, 2 and 6 are reference pictures, but pictures 1, 3, 5, and 7 are non-reference pictures. Using the efficiently coded motion vector techniques described above, any picture can serve as a collocated picture (for example, picture 5 may be a collocated picture).

Hardware Environment

Figure 21:
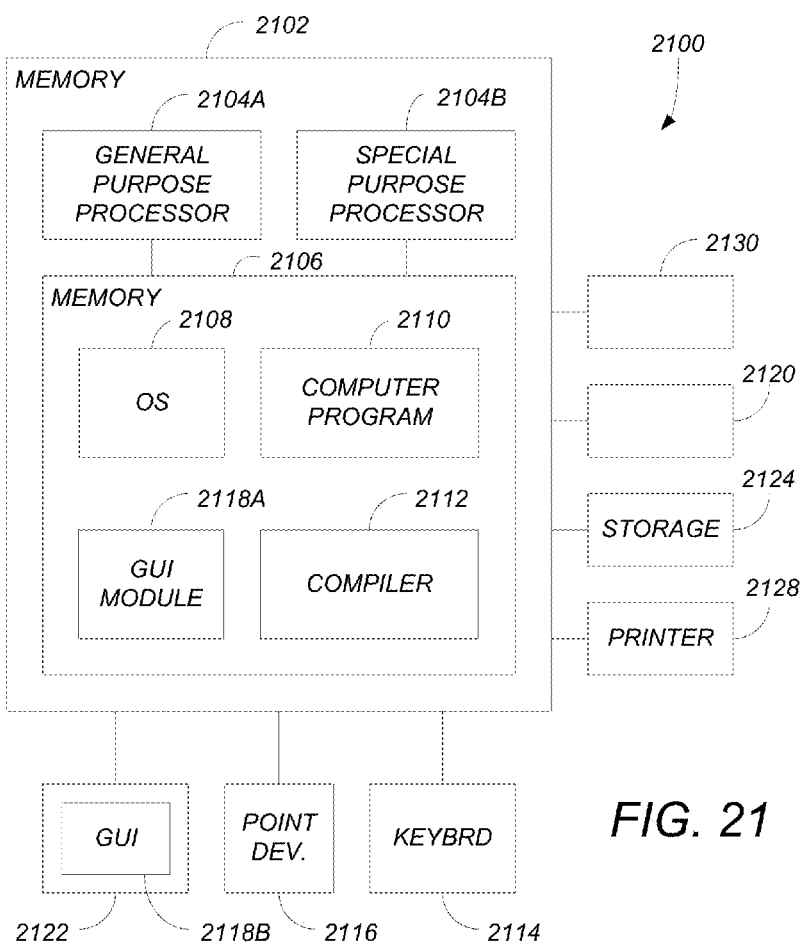
FIG. 21 illustrates an exemplary processing system 2100 that could be used to implement the embodiments of the invention.

FIG. 21 illustrates an exemplary processing system 2100 that could be used to implement the embodiments of the invention. The computer 2102 comprises a processor 2104 and a memory, such as random access memory (RAM) 2106. The computer 2102 is operatively coupled to a display 2122, which presents images such as windows to the user on a graphical user interface 2118B. The computer 2102 may be coupled to other devices, such as a keyboard 2114, a mouse device 2116, a printer, etc. Of course, those skilled in the art will recognize that any combination of the above components, or any number of different components, peripherals, and other devices, may be used with the computer 2102.

Generally, the computer 2102 operates under control of an operating system 2108 stored in the memory 2106, and interfaces with the user to accept inputs and commands and to present results through a graphical user interface (GUI) module 2118A. Although the GUI module 2118A is depicted as a separate module, the instructions performing the GUI functions can be resident or distributed in the operating system 2108, the computer program 2110, or implemented with special purpose memory and processors. The computer 2102 also implements a compiler 2112 which allows an application program 2110 written in a programming language such as COBOL, C++, FORTRAN, or other language to be translated into processor 2104 readable code. After completion, the application 2110 accesses and manipulates data stored in the memory 2106 of the computer 2102 using the relationships and logic that was generated using the compiler 2112. The computer 2102 also optionally comprises an external communication device such as a modem, satellite link, Ethernet card, or other device for communicating with other computers.

In one embodiment, instructions implementing the operating system 2108, the computer program 2110, and the compiler 2112 are tangibly embodied in a computer-readable medium, e.g., data storage device 2120, which could include one or more fixed or removable data storage devices, such as a zip drive, floppy disc drive 2124, hard drive, CD-ROM drive, tape drive, etc. Further, the operating system 2108 and the computer program 2110 are comprised of instructions which, when read and executed by the computer 2102, causes the computer 2102 to perform the steps necessary to implement and/or use the invention. Computer program 2110 and/or operating instructions may also be tangibly embodied in memory 2106 and/or data communications devices 2130, thereby making a computer program product or article of manufacture. As such, the terms "article of manufacture," "program storage device" and "computer program product" as used herein are intended to encompass a computer program accessible from any computer readable device or media.

The processing system 2100 may also be embodied in a desktop, laptop, tablet, notebook computer, personal data assistant (PDA), cellphone, smartphone, or any device with suitable processing and memory capability. Further, the processing system 2100 may utilize special purpose hardware to perform some or all of the foregoing functionality. For example the encoding and decoding processes described above may be performed by a special purpose processor and associated memory.

Those skilled in the art will recognize many modifications may be made to this configuration without departing from the scope of the present disclosure. For example, those skilled in the art will recognize that any combination of the above components, or any number of different components, peripherals, and other devices, may be used. For example, particular functions described herein can be performed by hardware modules, or a processor executing instructions stored in the form of software or firmware. Further, the functionality described herein can be combined in single modules or expanded to be performed in multiple modules.

Conclusion

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:
1. A method comprising:
receiving an input video stream including a plurality of input frames having a temporal sequence;
encoding, by a processor in response to instructions stored on a non-transitory computer readable medium, the plurality of input frames in a coding order, wherein encoding the plurality of input frames includes:
identifying a current input frame from the plurality of input frames based on the coding order, and
encoding the current input frame, wherein encoding the current input frame includes:
generating a current motion vector for the current input frame;
on a condition that encoding the current input frame includes intra-coding the current input frame, encoding the current input frame includes:
storing the current motion vector in an encoder collocated frame motion vector buffer, and
including a collocated frame motion vector buffer update indicator in an output bitstream, such that the collocated frame motion vector buffer update indicator indicates an instruction to update a decoder collocated frame motion vector buffer by storing the current motion vector in the decoder collocated frame motion vector buffer; and
on a condition that encoding the current input frame includes inter-coding the current input frame, encoding the current input frame includes:
identifying a first temporal location in the temporal sequence corresponding to a previous input frame from the plurality of input frames,
wherein the previous input frame precedes the current input frame in the coding order, and wherein a motion vector currently stored in the encoder collocated frame motion vector buffer is a motion vector generated for encoding the previous input frame,
identifying a second temporal location in the temporal sequence corresponding to the current input frame,
identifying a third temporal location in the temporal sequence corresponding to a subsequent input frame from the plurality of input frames, wherein the current input frame immediately precedes the subsequent input frame in the coding order,
on a condition that a temporal distance between the first temporal location and the third temporal location exceeds a temporal distance between the second temporal location and the third temporal location, encoding the current input frame includes:
updating the encoder collocated frame motion vector buffer by storing the current motion vector in the encoder collocated frame motion vector buffer; and
including the collocated frame motion vector buffer update indicator in the output bitstream, such that the collocated frame motion vector buffer update indicator indicates an instruction to update the decoder collocated frame motion vector buffer by storing the current motion vector in the decoder collocated frame motion vector buffer, and
on a condition that the temporal distance between the second temporal location and the third temporal location exceeds the temporal distance between the first temporal location and the third temporal location, encoding the current input frame includes:
omitting updating the collocated frame motion vector buffer; and
including the collocated frame motion vector buffer update indicator in the output bitstream, such that the collocated frame motion vector buffer update indicator indicates an instruction to omit updating the decoder collocated frame motion vector buffer;
and
transmitting or storing the output bitstream.

2. The method of claim 1, wherein including the collocated frame motion vector buffer update indicator in the output bitstream includes:
　　including the collocated frame motion vector buffer update indicator in a frame header.

3. The method of claim 1, wherein including the collocated frame motion vector buffer update indicator in the output bitstream includes:
　　including the collocated frame motion vector buffer update indicator in a header associated with a portion of a frame.

4. The method of claim 3, wherein the portion is a slice.

5. The method of claim 1, wherein the collocated frame motion vector buffer update indicator is a binary indicator, such that a first binary value of the collocated frame motion vector buffer update indicator indicates the instruction to update the decoder collocated frame motion vector buffer by storing the current motion vector in the decoder collocated frame motion vector buffer, and a second binary value of the collocated frame motion vector buffer update indicator indicates the instruction to omit updating the decoder collocated frame motion vector buffer.

6. The method of claim 1, wherein storing the current motion vector in the encoder collocated frame motion vector buffer includes:
　　storing the current motion vector in the encoder collocated frame motion vector buffer such that motion vectors associated with other frames are omitted from storage.

7. A method comprising:
　　receiving an input video stream including a plurality of input frames having a temporal sequence;
　　encoding, by a processor in response to instructions stored on a non-transitory computer readable medium, the plurality of input frames in a coding order, wherein encoding the plurality of input frames includes:
　　　　identifying a current input frame from the plurality of input frames based on the coding order, and
　　　　encoding the current input frame, wherein encoding the current input frame includes:
　　　　　　generating a current motion vector for the current input frame;
　　　　　　on a condition that encoding the current input frame includes intra-coding the current input frame, storing the current motion vector in an encoder collocated frame motion vector buffer;
　　　　　　on a condition that encoding the current input frame includes inter-coding the current input frame, encoding the current input frame includes:
　　　　　　　　identifying a first temporal location in the temporal sequence corresponding to a previous input frame from the plurality of input frames, wherein the previous input frame precedes the current input frame in the coding order, and wherein a motion vector currently stored in an encoder collocated frame motion vector buffer is a motion vector generated for encoding the previous input frame,
　　　　　　　　identifying a second temporal location in the temporal sequence corresponding to the current input frame, and
　　　　　　　　identifying a third temporal location in the temporal sequence corresponding to a subsequent input frame from the plurality of input frames, wherein the current input frame immediately precedes the subsequent input frame in the coding order;
　　　　　　　　determining whether to update a collocated frame motion vector buffer; and
　　　　　　　　including an indication of a result of determining whether to update the collocated frame motion vector buffer in an output bitstream, wherein:
　　　　　　　　　　on a condition that encoding the current input frame includes intra-coding the current input frame, including the indication of the result of determining whether to update the collocated frame motion vector buffer in the output bitstream includes including a collocated frame motion vector buffer update indicator in the output bitstream, such that the collocated frame motion vector buffer update indicator indicates an instruction to update a decoder collocated frame motion vector buffer by storing the current motion vector in the decoder collocated frame motion vector buffer; and
　　transmitting or storing the output bitstream.

8. The method of claim 7, wherein, on a condition that a temporal distance between the first temporal location and the third temporal location exceeds a temporal distance between the second temporal location and the third temporal location, encoding the current input frame includes updating the encoder collocated frame motion vector buffer by storing the current motion vector in the encoder collocated frame motion vector buffer, and including the indication of the result of determining whether to update the collocated frame motion vector buffer in the output bitstream includes including a collocated frame motion vector buffer update indicator in the output bitstream, such that the collocated frame motion vector buffer update indicator indicates an instruction to update a decoder collocated frame motion vector buffer by storing the current motion vector in the decoder collocated frame motion vector buffer.

9. The method of claim 7, wherein, on a condition that the temporal distance between the second temporal location and the third temporal location exceeds the temporal distance between the first temporal location and the third temporal location, encoding the current input frame includes omitting updating the collocated frame motion vector buffer, and including the indication of the result of determining whether to update the collocated frame motion vector buffer in the output bitstream includes including the collocated frame motion vector buffer update indicator in the output bitstream, such that the collocated frame motion vector buffer update indicator indicates an instruction to omit updating the decoder collocated frame motion vector buffer.

10. The method of claim 7, including the indication of the result of determining whether to update the collocated frame motion vector buffer in the output bitstream includes:
　　including the indication of the result of determining whether to update the collocated frame motion vector buffer in a frame header.

11. The method of claim 7, including the indication of the result of determining whether to update the collocated frame motion vector buffer in the output bitstream includes:
　　including the indication of the result of determining whether to update the collocated frame motion vector buffer in a header associated with a portion of a frame.

12. The method of claim 11, wherein the portion is a slice.

13. The method of claim 7, wherein, including the indication of the result of determining whether to update the collocated frame motion vector buffer in the output bitstream includes:
　　including a binary indicator in the output bitstream, such that a first binary value of the binary indicator indicates an instruction to update a decoder collocated frame motion vector buffer by storing the current motion vector in the decoder collocated frame motion vector buffer, and a second binary value of the binary indicator indicates an instruction to omit updating the decoder collocated frame motion vector buffer.

14. An apparatus comprising:

a memory; and a processor configured to execute instructions stored in the memory to:
- receive an input video stream, the input video stream including a plurality of input frames having a temporal sequence;
- encode the plurality of input frames in a coding order, wherein encoding the plurality of input frames includes:
  - identifying a current input frame from the plurality of input frames based on the coding order, and
  - encoding the current input frame, wherein encoding the current input frame includes:
    - generating a current motion vector for the current input frame;
    - on a condition that encoding the current input frame includes intra-coding the current input frame, encoding the current input frame includes:
      - storing the current motion vector in an encoder collocated frame motion vector buffer, and
      - including a collocated frame motion vector buffer update indicator in an output bitstream, such that the collocated frame motion vector buffer update indicator indicates an instruction to update a decoder collocated frame motion vector buffer by storing the current motion vector in the decoder collocated frame motion vector buffer; and
    - on a condition that encoding the current input frame includes inter-coding the current input frame, encoding the current input frame includes:
      - identifying a first temporal location in the temporal sequence corresponding to a previous input frame from the plurality of input frames, wherein the previous input frame precedes the current input frame in the coding order, and wherein a motion vector currently stored in the encoder collocated frame motion vector buffer is a motion vector generated for encoding the previous input frame,
      - identifying a second temporal location in the temporal sequence corresponding to the current input frame,
      - identifying a third temporal location in the temporal sequence corresponding to a subsequent input frame from the plurality of input frames, wherein the current input frame immediately precedes the subsequent input frame in the coding order,
      - on a condition that a temporal distance between the first temporal location and the third temporal location exceeds a temporal distance between the second temporal location and the third temporal location, encoding the current input frame includes:
        - updating the encoder collocated frame motion vector buffer by storing the current motion vector in the encoder collocated frame motion vector buffer; and
        - including the collocated frame motion vector buffer update indicator in the output bitstream, such that the collocated frame motion vector buffer update indicator indicates an instruction to update the decoder collocated frame motion vector buffer by storing the current motion vector in the decoder collocated frame motion vector buffer, and
      - on a condition that the temporal distance between the second temporal location and the third temporal location exceeds the temporal distance between the first temporal location and the third temporal location, encoding the current input frame includes:
        - omitting updating the collocated frame motion vector buffer; and
        - including the collocated frame motion vector buffer update indicator in the output bitstream, such that the collocated frame motion vector buffer update indicator indicates an instruction to omit updating the decoder collocated frame motion vector buffer; and
- transmit or store the output bitstream.

15. The apparatus of claim 14, wherein the processor is configured to execute instructions stored in the memory to:
- include the collocated frame motion vector buffer update indicator in the output bitstream by including the collocated frame motion vector buffer update indicator in a frame header.

16. The apparatus of claim 14, wherein the processor is configured to execute instructions stored in the memory to:
- include the collocated frame motion vector buffer update indicator in the output bitstream by including the collocated frame motion vector buffer update indicator in a header associated with a portion of a frame.

17. The apparatus of claim 16, wherein the portion is a slice.

18. The apparatus of claim 14, wherein the collocated frame motion vector buffer update indicator is a binary indicator, such that a first binary value of the collocated frame motion vector buffer update indicator indicates the instruction to update the decoder collocated frame motion vector buffer by storing the current motion vector in the decoder collocated frame motion vector buffer, and a second binary value of the collocated frame motion vector buffer update indicator indicates the instruction to omit updating the decoder collocated frame motion vector buffer.

19. The apparatus of claim 14, wherein the processor is configured to execute instructions stored in the memory to:
- store the current motion vector in the encoder collocated frame motion vector buffer by storing the current motion vector in the encoder collocated frame motion vector buffer such that motion vectors associated with other frames are omitted from storage.

* * * * *